(12) United States Patent
Juzkow et al.

(10) Patent No.: US 10,756,391 B2
(45) Date of Patent: Aug. 25, 2020

(54) METHOD AND SYSTEM FOR SECONDARY INTERNAL CURRENT MECHANISMS FOR A LITHIUM-ION CELL

(71) Applicant: NIO USA, Inc., San Jose, CA (US)

(72) Inventors: Marc W. Juzkow, Livermore, CA (US); Adam H. Ing, San Francisco, CA (US)

(73) Assignee: NIO USA, Inc., San Jose, CA (US)

( * ) Notice: Subject to any disclaimer, the term of this patent is extended or adjusted under 35 U.S.C. 154(b) by 23 days.

(21) Appl. No.: 16/168,497

(22) Filed: Oct. 23, 2018

(65) Prior Publication Data

US 2020/0127323 A1      Apr. 23, 2020

(51) Int. Cl.
| | |
|---|---|
| *H01M 10/058* | (2010.01) |
| *H01M 10/613* | (2014.01) |
| *H01M 2/12* | (2006.01) |
| *H01M 10/056* | (2010.01) |
| *H01M 10/0525* | (2010.01) |

(52) U.S. Cl.
CPC ....... *H01M 10/058* (2013.01); *H01M 2/1235* (2013.01); *H01M 10/056* (2013.01); *H01M 10/0525* (2013.01); *H01M 10/613* (2015.04)

(58) Field of Classification Search
None
See application file for complete search history.

(56) References Cited

U.S. PATENT DOCUMENTS

| | | | |
|---|---|---|---|
| 5,965,290 A  * | 10/1999 | Shimizu | H01M 2/14 429/211 |
| 8,241,772 B2 | 8/2012 | Hermann et al. | |
| 9,252,400 B2 | 2/2016 | LePort et al. | |
| 9,444,087 B1 * | 9/2016 | Jeon | H01M 2/0275 |
| 2009/0113697 A1* | 5/2009 | Yamamoto | H01M 10/0431 29/623.1 |
| 2009/0162749 A1* | 6/2009 | Lee | H01M 2/30 429/176 |
| 2010/0136387 A1 | 6/2010 | Kohn et al. | |
| 2010/0136391 A1 | 6/2010 | Prilutsky et al. | |
| 2010/0136424 A1 | 6/2010 | Hermann et al. | |

(Continued)

OTHER PUBLICATIONS

U.S. Appl. No. 15/994,570, filed May 31, 2018, Juzkow et al.

(Continued)

*Primary Examiner* — Scott J. Chmielecki
(74) *Attorney, Agent, or Firm* — Sheridan Ross P.C.

(57) ABSTRACT

An energy storage device having improved safety is provided, and methods of manufacturing the same. The device can be an electrochemical cell that includes: a positive electrode including a positive electrode active material in electrically conductive contact with a positive electrode current collector; a negative electrode including a negative electrode active material in electrically conductive contact with a negative electrode current collector and a negative electrode tab connected to the negative electrode current collector and a negative electrically conductive member; an electrically insulative and ion conductive medium in ionically conductive contact with the positive electrode and the negative electrode; and an outer case containing the positive electrode, negative electrode and electrically insulative and ion conductive medium, where the outer case comprises a scored area connected to a cooling plate.

20 Claims, 12 Drawing Sheets

(56) References Cited

U.S. PATENT DOCUMENTS

| | | | |
|---|---|---|---|
| 2010/0247996 A1 | 9/2010 | Ijaz et al. | |
| 2012/0107663 A1* | 5/2012 | Burgers | H01M 10/6551 |
| | | | 429/120 |
| 2013/0059181 A1* | 3/2013 | LePort | H01M 2/1282 |
| | | | 429/89 |
| 2015/0380697 A1 | 12/2015 | Osborne et al. | |
| 2016/0197322 A1* | 7/2016 | Tyler | H01M 2/206 |
| | | | 429/89 |
| 2016/0336547 A1* | 11/2016 | Dawson | H01M 2/0242 |
| 2016/0351902 A1* | 12/2016 | Hamanaka | H01M 4/623 |
| 2017/0098806 A1 | 4/2017 | Bowersock et al. | |
| 2017/0125862 A1* | 5/2017 | DeKeuster | H01M 2/305 |
| 2018/0069281 A1* | 3/2018 | Tutzer | H01M 10/486 |
| 2018/0108955 A1* | 4/2018 | Fees | H01M 2/022 |
| 2019/0081284 A1* | 3/2019 | Azuma | H01M 2/0202 |
| 2019/0097228 A1* | 3/2019 | Kobayashi | H01M 4/75 |
| 2019/0229384 A1* | 7/2019 | Tasiopoulos | H01M 2/12 |
| 2019/0372173 A1* | 12/2019 | Juzkow | H01M 2/1077 |

OTHER PUBLICATIONS

"2535 Self Adhesive High Expansion Sealer," Product Data Sheet, Nitto Denko Corporation, 2013, 1 page.

"5880 & 5880C Self-Adhesive Expandable Weldable Sealers," Product Data Sheet, Nitto Denko Corporation, 2013, 1 page.

"Willseal® 600," Willseal LLC, Product Data Sheet, 2015, 13 pages.

Mikolajczak et al., "Lithium-Ion Batteries Hazard and Use Assessment," The Fire Protection Research Foundation, Jul. 2011, 126 pages.

Roth, "Abuse Response of 18650 Li-Ion Cells with Different Cathodes Using EC:EMC/LiPF6 and EC:PC:DMC/LiPF6 Electrolytes," The Electrochemical Society, ECS Transactions, 2008, vol. 11(19), pp. 19-41.

Wilson, "CC Expanding Sealer—An Alternative to 1- and 2-Part Expanding Foams," 3-C Production AB, 2010, 4 pages.

Official Action for U.S. Appl. No. 15/994,570, dated Mar. 27, 2020, 8 pages.

\* cited by examiner

METHOD AND SYSTEM FOR SECONDARY INTERNAL CURRENT MECHANISMS FOR A LITHIUM-ION CELL

FIELD

The present disclosure is generally directed to electrochemical cells having improved internal current mechanisms and batteries including electrochemical cells having improved internal current mechanisms.

BACKGROUND

In recent years, the demand for high performance batteries has increased, driven in part by the increasingly large number of portable consumer electronics products and growing needs of batteries for fuel efficient vehicles. Lithium-ion cells are found in many applications requiring high energy and high power densities, as they can provide high volumetric and gravimetric efficiency in batteries and battery packs. Such batteries and battery packs can be used in many applications, for example in portable electronic devices and in fuel-saving vehicles.

These batteries and battery packs are generally arranged in the form of electrically interconnected individual battery modules containing a number of individual battery cells. The battery modules are generally connected to an electrical control system to provide a desired available voltage, ampere-hour, and/or other electrical characteristics to a vehicle. However, although normally self-contained, lithium-ion cells can cause safety issues and even explode due to events including short circuiting, overcharging, and overheating.

Therefore, there is a need to develop designs and methods for improving the safety of electrochemical cells and battery modules including electrochemical cells. The present disclosure satisfies these and other needs.

DETAILED DESCRIPTION

Figure 1A:
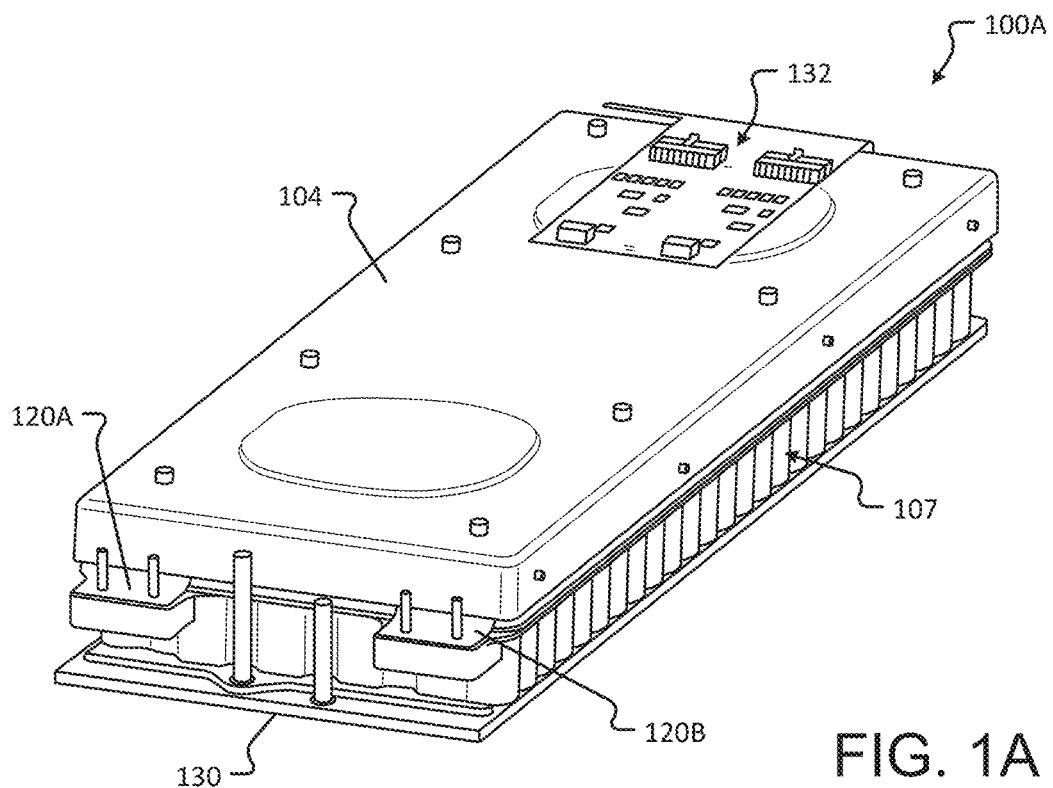
FIG. 1A shows a perspective view of a battery module in accordance with embodiments of the present disclosure.

Embodiments of the present disclosure will be described in connection with electrochemical cells, and in some embodiments, the construction, structure, and arrangement of components making up electrochemical cells and the methods of manufacturing electrochemical cells. Embodiments of the present disclosure will be described in connection with modules including electrochemical cells, and in some embodiments, the construction, structure, and arrangement of components making up modules including electrochemical cells and the methods of manufacturing modules including electrochemical cells.

An electrical energy storage device for a vehicle may include one or more battery packs, each including a number of battery modules electrically interconnected with one another to provide electromotive force for the electrical drive system of a vehicle to operate. Each battery module in the battery pack can include any number of battery cells contained and/or arranged within a battery module housing and adjacent to a cooling plate.

In some embodiments, the lithium-ion cells as disclosed herein can have negative electrodes including negative electrode active materials such as hard carbon, graphite, silicon compounds, or a combination thereof, and positive electrodes including positive electrode active materials whose charge storage and discharge mechanisms involve the de-insertion and insertion of Li ions, respectively. In some embodiments, this is accomplished by intercalation and de-intercalation in and out of a layered, olivine or spinel structure.

The term "positive electrode" refers to one of a pair of rechargeable lithium-ion cell electrodes that under normal circumstances and when the cell is fully charged will have the higher potential versus a lithium reference electrode. This terminology is retained to refer to the same physical electrode under all cell operating conditions even if such electrode temporarily (e.g., due to cell overdischarge) is driven to or exhibits a potential below that of the other (the negative) electrode.

The term "negative electrode" refers to one of a pair of rechargeable lithium-ion cell electrodes that, under normal circumstances and when the cell is fully charged, will have the lower potential versus a lithium reference electrode. This terminology is retained to refer to the same physical electrode under all cell operating conditions even if such electrode is temporarily (e.g., due to cell overdischarge) driven to or exhibits a potential above that of the other (the positive) electrode.

One problem with electrochemical cells and battery modules in a vehicle is thermal instability in the event of a crash scenario. In a crash scenario (or other type of event that is abusive to the cells and/or module), the cells may become damaged by the sudden force. The damage can cause one or more of the cells to short circuit (e.g., due to an internal short circuit or an external short circuit), resulting in heat generation. When an abusive event generates heat inside the cell, both flammable and non-flammable gases are generated internally due to breakdown of the electrolyte. The buildup of gas pressure can activate a pressure actuated internal current disconnect mechanism in the header; however, this internal current disconnect mechanism in the header does not always work as designed and the heat from the cell may cause other cells to also overheat. Some cylindrical cell designs also have a scored vent on the bottom of the cell for redundancy. As other cells overheat, the danger from the overheating and generation of flammable gases increases. Thus, improvements to the internal current mechanisms are needed.

Also, typically the battery pack is also one of the largest, heaviest, and most expensive single components of an electric vehicle. Any event that causes one cell to damage other cells within the module is undesirable due to safety concerns and the loss of module functionality (e.g., due to multiple damaged cells). As can be appreciated, improvements to the methods or systems for internal current mechanisms in cells (including the disconnection or interruption of current within cells) can be advantageous due to improved safety and cost savings, for example.

Embodiments described herein advantageously reduce or prevent cells from short circuiting and/or overheating. For example, by forming one or more secondary internal current mechanisms as described herein (e.g., via connection of one or more scored areas to a cooling plate and/or the use of electrically insulative tape and/or electrically insulative layers together with a negative tab that is connected to an internal bottom surface of the case (also referred to herein as "can")), secondary internal current mechanisms can be formed. As can be appreciated, the secondary internal current mechanisms can provide a battery module and battery pack that are safer due to it being less likely that a single cell will suffer excessive heating and/or damage other cells in the battery module.

Embodiments described herein include battery modules using lithium-ion cells that reduce the chance of cell, module, or battery pack explosions upon crash by providing secondary current interrupt mechanisms designed into the cell, thereby improving the overall safety of the battery module and battery.

In various aspects, one or more scores are provided in the case of a cell. The scores may surround the location of a negative terminal at the bottom of the case (e.g. an area of the case that corresponds to where the negative tab is in contact with an interior surface of the case) and the case may be connected to a rigid structure of the module. Thus, in the event of a physical impact, the score(s) may open up (e.g., physically separate one side of the score from the other) to create an opening in the case and vent the cell. Also, when the score(s) open up, the negative electrode tab that is connected to the negative terminal can become disconnected from the negative electrode due to the area of the case that includes the negative terminal (e.g., an area that includes the connection of the case to the negative tab) breaking off of the remainder of the case at the time of the physical impact thereby causing the negative terminal and at least a portion of the negative tab to break apart (e.g., break off or disconnect) from the negative electrode.

In certain aspects, an internal negative tab is protected from physical contact with the case (with the exception of an area where it is connected to the case, such as a weld spot) using an electrically insulative tape and/or electrically insulative layers. The case of the lithium-ion cell can have one or more scores on a surface of the case and/or within a surface of the case. When the scores separate or break open, the scores create vents in the case where the scored area breaks away from the remainder of the case and the internal components of the case. The internal negative tab is welded on an interior surface of the case within the scored area. Thus, when the scored area breaks open, at least a portion of the negative tab remains in contact with the case within the scored area but the negative tab breaks apart to separate from the negative electrode and break the electrical connection.

In further aspects, in the battery module, the bottoms of one or more lithium-ion cells have a scored area on their case that is adhered (e.g., glued) to a rigid component such as a cooling plate. The scored area may act as a bottom vent for the cell(s) when a cell with its scored area adhered to the cooling plate is dislodged due to the cell moving in relation to the cooling plate but the scored area staying adhered to the cooling plate such that it becomes at least partially separated from the cell(s).

In various embodiments, there are one or more other layers between the cell and the rigid component. For example, there may be a coating layer in direct contact with the cooling plate, and the adhesive that adheres to bottom sides of the cells has the coating layer between itself and the cooling plate. The adhesive may be an electrically insulating adhesive. The adhesive may be an electrically insulating liquid adhesive. The coating layer may be an electrically insulating coating layer.

In certain aspects, entire surface areas of bottom sides of the cells may be adhered to the cooling plate. In other aspects, only portions of the bottom sides of the cells may be adhered to the cooling plate. For example, only areas adjacent to, or within, the scores/scored areas may be adhered to the cooling plate.

In some embodiments, when the negative electrode tab is welded within the scored area, when the cell is dislodged the can becomes electrically isolated and advantageously immune to any external short circuit or other electrical abuses including overcharge and over discharge. In addition, removing at least a portion of the bottom side of the cell can advantageously reduce or eliminate any explosive gas buildup. Further, removing at least a portion of the bottom side of the cell can advantageously allow the anode to react with ambient air, thereby increasing the internal cell resistance and decreasing the ability for ion-transfer so that the chance of short circuit due to cell electrical currents is reduced should a cell be externally shorted.

Various embodiments include a negative electrode tab that is connected to a negative electrode and a negative terminal of the cell where the negative terminal becomes electrically isolated from the negative electrode upon damage to the cell.

Various embodiments relate to an electrochemical cell that includes a positive electrode having a positive terminal, a negative electrode having a negative terminal, and an ion conductive medium in ionically conductive contact with the positive electrode and the negative electrode. The cell includes a negative electrode tab including a first attachment end and a second attachment end, where the first attachment end is connected to the negative electrode. The negative electrode includes a negative electrode active material and a negative electrode current collector. The negative electrode current collector is in contact with the negative electrode active material. The first attachment end of the negative electrode tab can be in contact with the negative electrode current collector. The second attachment end of the negative electrode tab can connect to the can, for example. an interior bottom surface of the can.

The electrochemical cell may include a positive electrode tab including a first attachment end and a second attachment end, where the first attachment end can be connected to a positive electrode. The positive electrode includes a positive electrode active material and a positive electrode current collector, where the positive electrode current collector is in contact with the positive electrode active material. The first attachment end of the positive electrode tab can connect to the positive electrode current collector. The second attachment end of the positive electrode tab can connect to the positive terminal of the electrochemical cell.

At least a portion of the negative electrode tab may be in contact with an electrically insulative tape. For example, the electrically insulative tape may extend along portions of sides of the negative electrode tab where the negative electrode tab would otherwise be in contact with the case of the cell. The electrically insulative tape may extend along the negative electrode tab at additional portions of the negative electrode tab other than only where the negative electrode tab would otherwise be in contact with the case of the cell. In some embodiments, the electrically insulative tape may extend along sides of the negative electrode tab from the negative electrode current collector to about a few millimeters from where the negative electrode tab contacts the can.

At least a portion of the bottom of the case may include one or more insulative layers. For example, the insulative layers may extend along portions of an interior of the bottom of the cell to electrically insulate the case from the charged components within the cell. The insulative layers may be used in addition to, or instead of, the electrically insulative tape.

In embodiments, the electrochemical cell is enclosed within the case where the case has an opening at the positive electrode. In various embodiments, the electrodes may be referred to herein as terminals. The case may be pre-manufactured (e.g., prior to assembly of the cell) by a manufacturer that designs the case, including score(s) in the case.

Embodiments can provide an electrochemical cell, including: a positive electrode including a positive electrode active material in electrically conductive contact with a positive electrode current collector; a negative electrode including a negative electrode active material in electrically conductive contact with a negative electrode current collector and a negative electrode tab including a first attachment end and a second attachment end; an electrically insulative and ion conductive medium in ionically conductive contact with the positive electrode and the negative electrode, where the ionically conductive medium comprises an ion conductive layer and an electrolyte; and an outer case containing the positive electrode, negative electrode and electrically insulative and ion conductive medium, where the outer case includes one or more scored areas connected to a cooling plate, and where the first attachment end of the negative electrode tab is connected to the negative electrode current collector and the second attachment end of the negative electrode tab is connected to an interior surface of the outer case.

Embodiments can provide an energy storage device, including: a positive electrode including a positive electrode active material in electrically conductive contact with a positive electrode current collector; a negative electrode including a negative electrode active material in electrically conductive contact with a negative electrode current collector and a negative electrode tab including a first attachment end and a second attachment end; an electrically insulative and ion conductive medium in ionically conductive contact with the positive electrode and the negative electrode, where the ionically conductive medium comprises an ion conductive layer and an electrolyte; and an outer case containing the positive electrode, negative electrode and electrically insulative and ion conductive medium, where the outer case includes one or more scored areas connected to a cooling plate, and where the first attachment end of the negative electrode tab is connected to the negative electrode current collector and the second attachment end of the negative electrode tab is connected to an interior surface of the outer case.

Embodiments can provide a method of manufacturing an electrochemical cell, including: providing a positive electrode including a positive electrode active material in electrically conductive contact with a positive electrode current collector; providing a negative electrode including a negative electrode active material in electrically conductive contact with a negative electrode current collector and a negative electrode tab including a first attachment end and a second attachment end; providing an electrically insulative and ion conductive medium in ionically conductive contact with the positive electrode and the negative electrode, where the ionically conductive medium comprises an ion conductive layer and an electrolyte; and providing the case containing the positive electrode, negative electrode and electrically insulative and ion conductive medium, where the outer case includes one or more scored areas connected to a cooling plate, and where the first attachment end of the negative electrode tab is connected to the negative electrode current collector and the second attachment end of the negative electrode tab is connected to an interior surface of the outer case.

Embodiments can provide an energy storage device, including: at least one electrochemical cell, including: a positive electrode including a positive electrode active material in electrically conductive contact with a positive electrode current collector; a negative electrode including a negative electrode active material in electrically conductive contact with a negative electrode current collector; an electrically insulative and ion conductive medium in ionically conductive contact with the positive electrode and the negative electrode, where the ionically conductive medium includes an ion conductive layer and an electrolyte; and an outer case containing the positive electrode, negative electrode and electrically insulative and ion conductive medium, where the outer case is adhered to a cooling plate.

Embodiments can provide a method of manufacturing an energy storage device, including: providing at least one electrochemical cell, including: providing a positive electrode including a positive electrode active material in electrically conductive contact with a positive electrode current collector; providing a negative electrode including a negative electrode active material in electrically conductive contact with a negative electrode current collector; providing an electrically insulative and ion conductive medium in ionically conductive contact with the positive electrode and the negative electrode, where the ionically conductive medium includes an ion conductive layer and an electrolyte; and providing an outer case containing the positive electrode, negative electrode and electrically insulative and ion conductive medium, where the outer case is adhered to a cooling plate.

FIG. 1A shows a perspective view of a battery module 100A in accordance with embodiments of the present disclosure. The battery module 100A shown in FIG. 1A includes an upper shield 104 configured to substantially cover battery cell interconnects (not shown), battery cells (positioned within the shaped side walls 107), and other electrical connections (e.g., first and second battery module busbars 120A, 120B, etc.). In some embodiments, the upper shield 104 may correspond to a drip shield. In any event, the upper shield 104 may be made from molded, formed, or otherwise shaped plastic, dielectric, or nonconductive material. In one embodiment, the battery management system (BMS) 132 electronics (e.g., printed circuit board, chips, etc.) may be mounted to an exterior or interior surface of the upper shield 104. As shown in FIG. 1A, the BMS 132 and corresponding electronics are mounted to an exterior surface (e.g., a surface separate and spaced apart from the battery cells and battery cell interconnects, etc.). The cells may be adjacent to (or connected to) a rigid structure, such as a cooling plate 130, at the bottom sides of the cells.

Figure 1B:
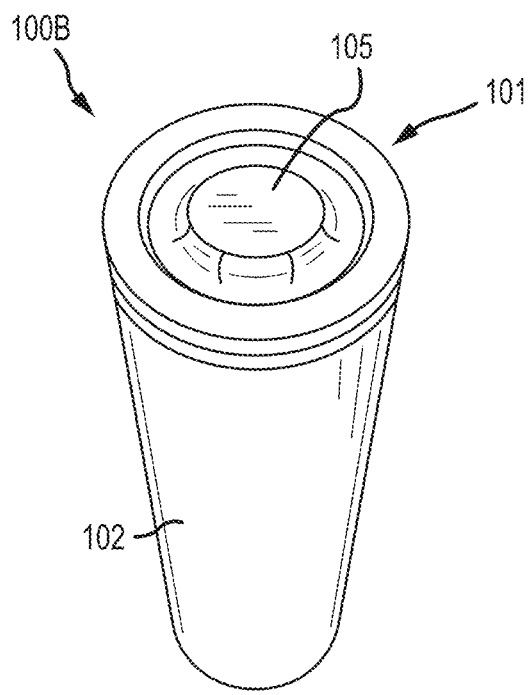
FIG. 1B shows a perspective view of the top and a side of a cell in accordance with embodiments of the present disclosure.

FIG. 1B shows a perspective view of the top and a side of a cell 100B in accordance with embodiments of the present disclosure. FIG. 1B shows a top side of the cell 101, a side of the cell that is the case on the side 102, and a positive terminal 105.

In embodiments of the present disclosure, the cell 100B can use a conventional header. Conventional lithium-ion cells can utilize a mechanical safety device and a positive thermal coefficient (PTC) device. A device called a Current Interrupt Device (CID) can be used. The CID device may have functions that include overcharge protection, overvoltage protection and protection against other abusive conditions that lead to increased internal pressure. Increased internal pressure can cause a disc (sometimes referred to as a vent disc) to move and separate from another disc (sometimes referred to as a weld disc). Also, indirectly high temperature can lead to electrolyte decomposition, gas generation and increased internal cell pressure. The movement of the vent disc can break a weld and disconnect the positive header of the cell from the positive electrode, thereby permanently interrupting the flow of current in or out of the cell. The PTC device can protect against over current and can also activate when a high temperature is reached. In an over current situation, increased current through the PTC device increases the device temperature and causes the PTC device resistance to increase several orders of magnitude. Thus, temperature can be used to activate the PTC device when a high temperature is reached. This high temperature can result from either an overcurrent through the resistive PTC device or high internal or external temperatures. The PTC device does not totally eliminate the current into or out of the cell; the current is decreased.

In addition, because the case 102 of the cell is at a negative potential (as discussed herein), a cell case can short other cells by contacting the other cell's header and crimp to create an electrical connection. Other metal components including the bus bars can also short the cells. A short circuit condition can generate significant heat and can lead to cell venting, smoke, and fire. Conventional CIDs and PTC devices are meant to mitigate these problems; however, CIDs and PTC devices may fail or not function as intended. Thus, improvements to cell and module safety and reliability (e.g., by improving internal cell current mechanisms) are desired.

Because various standard lithium-ion cell components (e.g. cases and headers) can be used, cells as disclosed herein may not require adjustments to manufacturing processes for making the cells of the present embodiments. In addition, the lithium-ion cells disclosed herein may use any type of positive and negative terminal design, with varying components, including but not limited to the use of PTC devices, thin metal tabs, and CID devices, and any methods and materials may be used for components of the cells, including but not limited to any type of tape, any type of welding materials, and any methods of taping and welding. Advantages of using a same or similar process and/or components and/or materials include the reuse of same or similar manufacturing processes and/or equipment.

Lithium-ion cells of the present disclosure may be assembled according to any methods known in the art. Methods of manufacturing lithium-ion cells can include providing a positive electrode including a positive electrode active material in electrically conductive contact with a positive electrode current collector; providing a negative electrode including a negative electrode active material in electrically conductive contact with a negative electrode current collector; providing an electrically insulative and ion conductive medium in ionically conductive contact with the positive electrode and the negative electrode, wherein the ionically conductive medium includes an ion conductive layer and an electrolyte; and providing a negative electrode tab having a first attachment end and a second attachment end, where the first attachment end of the negative electrode tab is connected to the negative electrode current collector, where the second attachment end of the negative electrode tab is connected to an interior bottom surface of the case, and where an electrically insulative tape is in contact with a portion of the negative electrode tab. Illustrative embodiments of components of a lithium-ion cell are shown and described in relation to FIG. 5.

Figure 2:
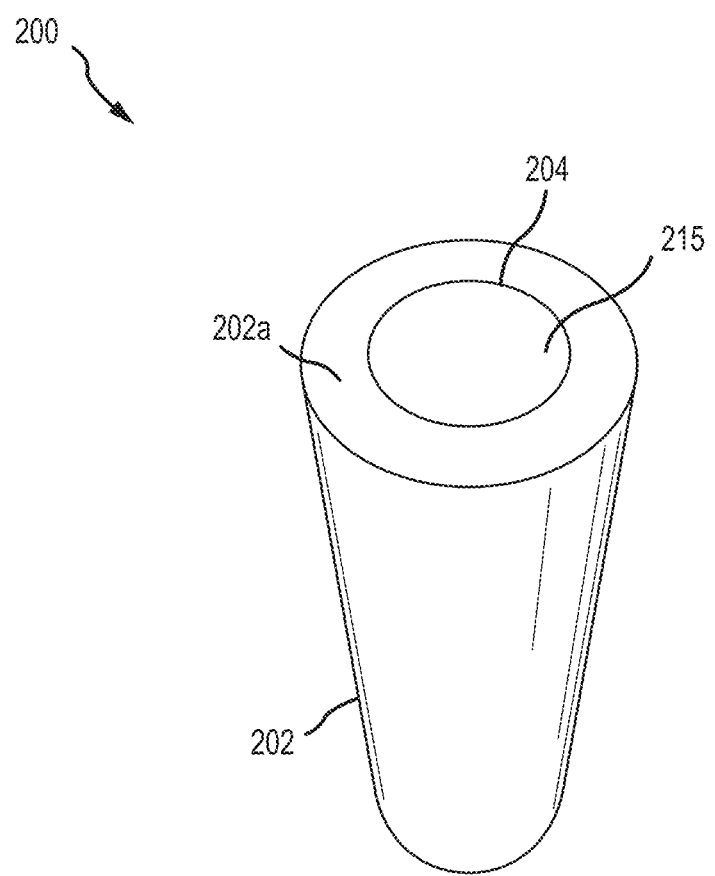
FIG. 2 shows a first perspective view of the bottom and side of a cell in accordance with embodiments of the present disclosure.

Referring to FIG. 2, a perspective view of the bottom and a side of a cell 200 is shown in accordance with embodiments of the present disclosure. In various embodiments, the cell 200 may include a case 202 that extends to include the bottom side of the cell 202a. For example, the case 202 may surround sides of the cell together with the bottom side of the cell. The case 202 at the bottom of the cell may be referred to by reference number 202a herein. In various embodiments, the case may have a cylindrical shape with only one end that is open during manufacturing of the cell, and the cell's components are inserted for cell assembly at the open end and then the cell is sealed when the header is assembled on the cell. The header includes the positive terminal (e.g., positive terminal 105). A gasket can separate a positive terminal (e.g., at the top side 101 of the cell as shown in FIG. 1) from the case 202 on the upper side of the cell in order to electrically insulate the case 202 from the positive terminal (e.g., positive terminal 105 as shown in FIG. 1).

The cell 200 has a negative terminal (not shown in FIG. 2) that is integral with the case 202. For example, the negative terminal may be formed by welding or otherwise adhering a negative electrode tab to an interior of the case 202 at the bottom side of the cell 202a; thus, the negative terminal is the location on the case 202 that corresponds to the position at which the negative electrode tab is connected. The negative terminal may be located on the case 202 within the scored area 215 on the bottom side of the cell 202a. Thus, the case 202 (e.g., due to the connection of the negative terminal at the bottom side of the case 202) is at a negative potential (e.g., for a Li-ion cell, the case is at a negative potential versus Li/Li+). The scored area 215 can be flush with the case on the bottom side of the cell 202a, extend beyond the case on the bottom side of the cell 202a, or be inset within the case on the bottom side of the cell 202a.

The score 204 creating the scored area 215 may be an integral part of the case 202. For example, the score 204 may be present when the case 202 itself is manufactured, prior to when components of the cell 200 are assembled. Alternatively, the score 204 may be added after the case 202 has been manufactured, e.g., at any time before or during the manufacturing of the cell 200.

The material of the case 202 may be any material and is not limited by the description herein. For example, the case 202 can be a nickel-plated mild steel or stainless steel metal case, where the case is at the negative potential versus Li/Li+. The case may also be aluminum, where the case would be at the positive potential versus Li/Li+.

Figure 3:
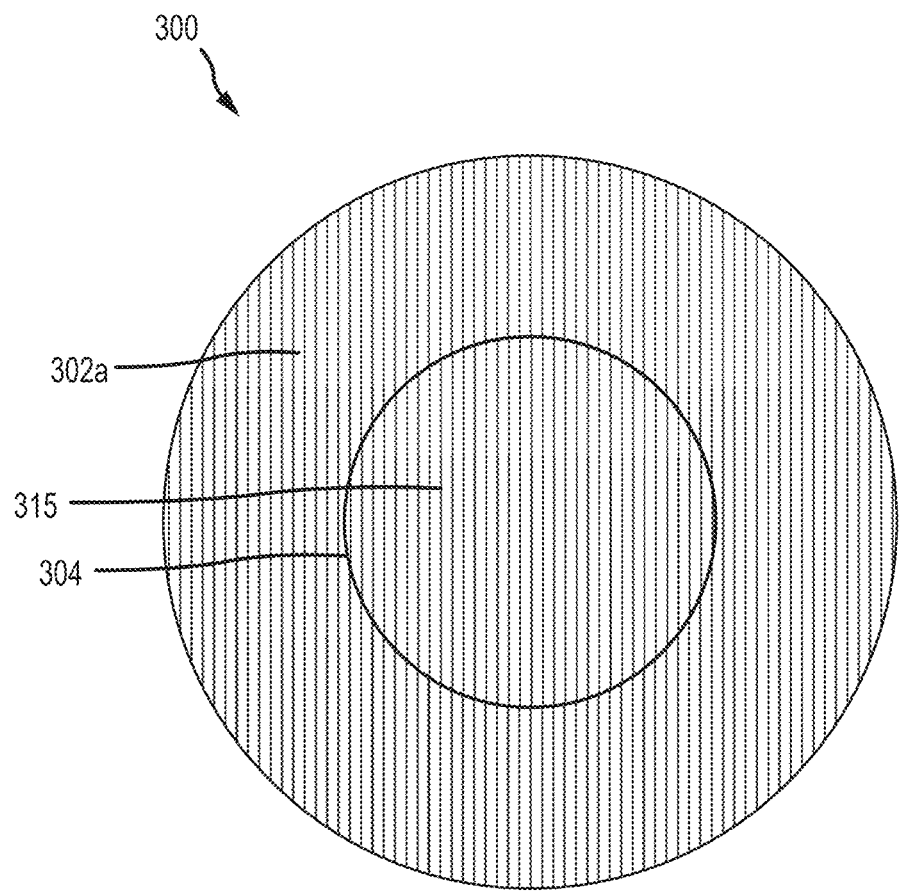
FIG. 3 shows a bottom view of the bottom of a cell in accordance with embodiments of the present disclosure.

Referring to FIG. 3, this figure shows a bottom view of the bottom of a cell 300 in accordance with embodiments of the present disclosure. In some embodiments, the case on the bottom of the cell 302a includes the scored area 315 within a score 304 on the bottom of the case 302a. In certain aspects, the case may be a 21 mm diameter can and the scored area is an area less than an area of the bottom of the case (e.g., less than 346 mm$^2$) and more typically no more than about 75% of the area of the case bottom. The negative electrode tab (not shown in FIG. 3) is adhered to an interior surface of the case within the score 304, e.g., at a center of the circular scored area 315. As described herein, the score 304 and the scored area 315 can be any size or shape, and are not limited by the present disclosure.

As used herein, the term "score" includes any type of score, notch, or line created (e.g., scratched, cut, notched, scraped, incised, nicked, gouged, etc.) in a surface. The term "score" includes only one score or multiple scores. A score, as described herein, may be any size or shape, for example it may have various areas (including lengths and widths) and volumes (including depths and cross-sectional areas, including various shapes of cross-sectional areas). There may be various types of scores used together in the embodiments disclosed herein and there may be multiple scored areas in the embodiments disclosed herein because the present disclosure is not limiting. The score(s) in the case may cause the case to be structurally weaker at certain points (e.g., along the score(s) and/or at an area surrounding the score(s)). Thus, the score(s) can increase the likelihood of structural failure of the case in certain areas; e.g., when surfaces on either side of the score(s) move in relation to one another, thereby causing the score to break, creating a tear/gap or opening in the case. The design and/or location of the score(s) may be determined by the manufacturer of the case or added after the case has been manufactured.

Figure 4:
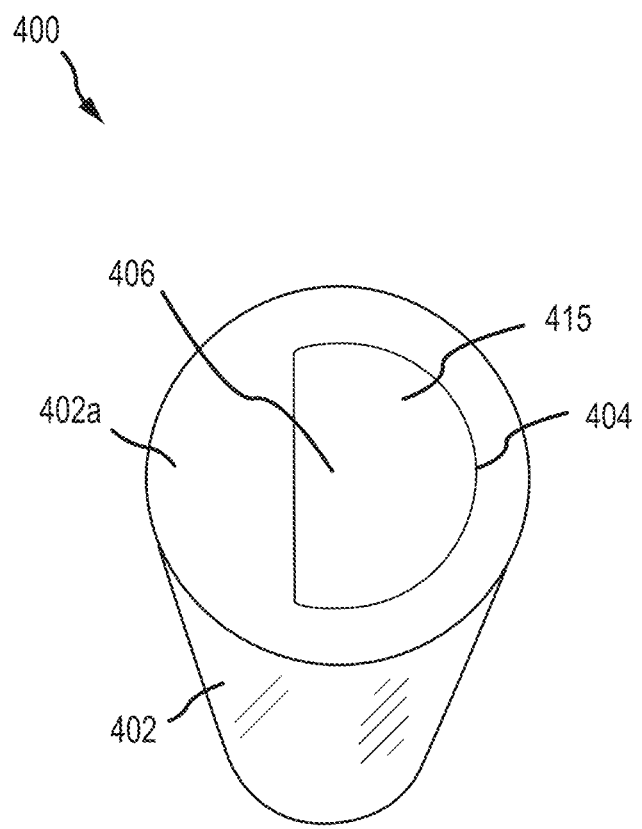
FIG. 4 shows a second perspective view of the bottom and a side of a cell in accordance with embodiments of the present disclosure.

Referring to FIG. 4, a perspective view of the bottom and a side of a cell 400 is shown in accordance with embodiments of the present disclosure. The cell 400 may include a case 402 that extends to the bottom side of the cell 402a. The case 402 may surround sides of the cell and the bottom side of the cell, and the case 402 at the bottom of the cell may be referred to by reference number 402a herein. The cell 400 has a negative terminal 406 (e.g., a position at which the negative tab (not shown in FIG. 4) is welded to the case) that is at a center of the bottom side of the cell 402a and a scored area 415 that surrounds (e.g., encloses an area of) the negative terminal 406. The negative terminal 406 may not be visible from an outside side of the case of the cell but corresponds to a location on the interior of the cell where the negative electrode tab is welded. Thus, the negative terminal 406 may be an integral part of the case 402. The description herein does not limit the configuration of a negative electrode tab or a negative terminal.

As shown in FIG. 4, the score 404 may have a semicircular shape on the bottom of the cell 402a, and the scored area 415 within the score 404 includes an area where the negative terminal 406 is located on the case 402 on the bottom of the cell 402a. The score 404 and/or the scored area 415 can have any configuration; for example, the score 404 and/or the scored area 415 can be flush with the case on the bottom side of the cell 402a, extend beyond the case on the bottom side of the cell 402a, or be inset within the case on the bottom side of the cell 402a.

As discussed herein, and as shown in FIG. 4, the score 404 does not need to be a circular shape, and may be any arcuate or non-arcuate shape, including a semicircular shape and any asymmetrical shape. The score 404 may be located at any position on the case 402, and does not need to be only on a bottom side of the case 402.

In various aspects, the negative terminal 406 may be adjacent to (and/or electrically and/or structurally connected to) a position on the bottom side of the cell 402a that also has a score in the case 402. A score in the case 402 that corresponds to the negative terminal 406 may be any size or shape, for example it may have various areas (including lengths and widths) and volumes (including depths and cross-sectional areas, including various shapes of cross-sectional areas within the score). Also, a scored area corresponding to a score for the negative terminal 406 may have any size and shape. Regarding any score(s) and scored area(s), the present disclosure is not limiting.

Figure 5:
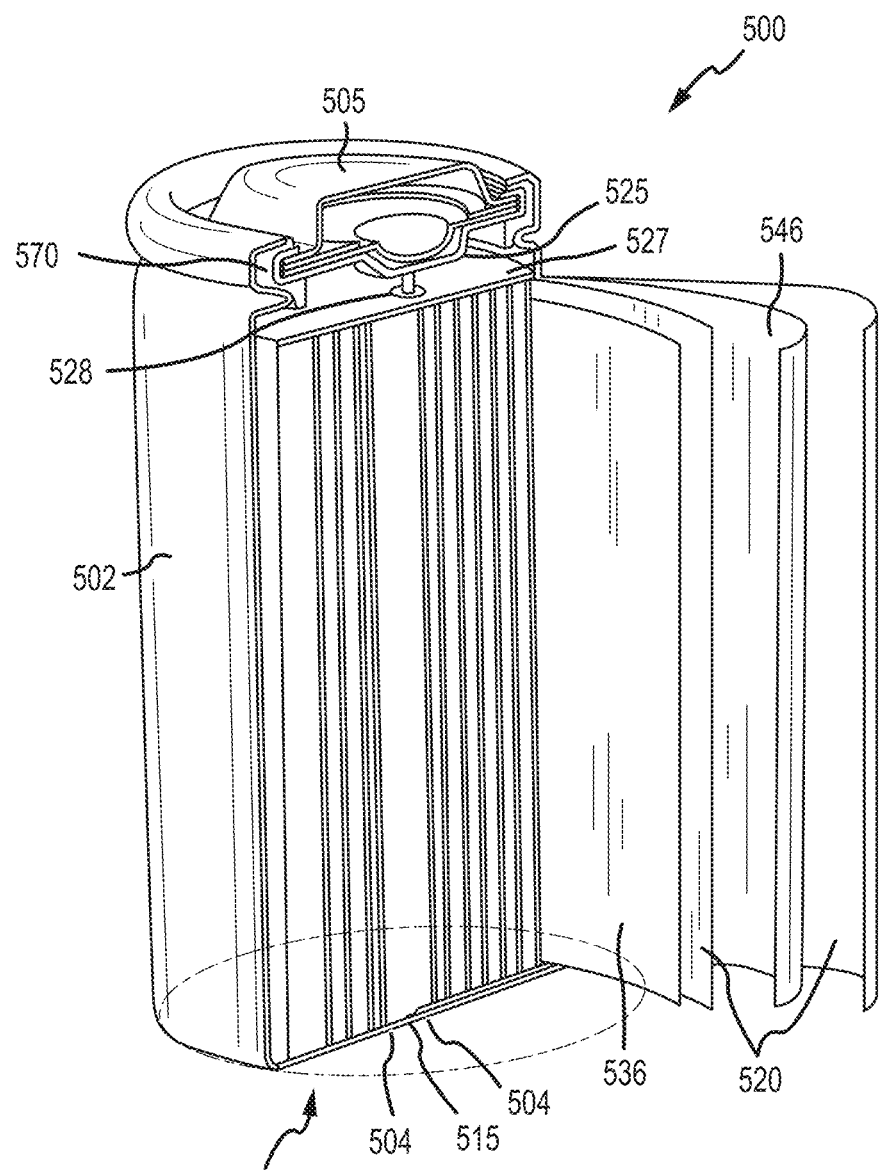
FIG. 5 shows a perspective view of the top, a side, the bottom, and the interior of a cell in accordance with embodiments of the present disclosure.

In various embodiments, the scored area 415 can act as a gas removal vent in addition to providing an electrical disconnect between the case and the negative electrode. Illustrative embodiments of such configurations are discussed further in FIGS. 7 and 9. FIG. 5 shows a perspective view of the top, the side, the bottom, and the interior of a cell 500 in accordance with embodiments of the present disclosure. The cell 500 includes a case 502 and a top side of the cell having a positive electrode tab 528 extending through a hole in an internal insulator 527 to connect (such as by laser welding) a positive electrode 536 (e.g., via a positive electrode current collector, not shown) to the weld plate 525. The weld plate 525 is in electrical contact with the positive terminal 505, which is a cover of the cell 500. Thus, the positive electrode 536 is electrically connected to the positive terminal 505. The weld plate 525 may be any material used for weld plates in conventional cells, including but not limited to aluminum or an aluminum alloy. The positive terminal 505 is electrically isolated from the case 502 by a gasket 570.

The interior of the cell 500 includes a positive electrode 536, a negative electrode 546, separators 520, and an electrolyte. The positive electrode 536 can include a positive electrode active material and a positive electrode current collector having a conductive coating. The negative electrode 546 can include a negative electrode active material and a negative electrode current collector having a conductive coating. The electrolyte may be present within the positive electrode 536, the negative electrode 546, and the separators 520, and may include a lithium compound such that the electrolyte, the positive electrode 536, and the negative electrode 546 are in ionically conductive contact with each other. The positive electrode 536, negative electrode 546, separators 520, and electrolyte are discussed in further detail herein.

The interior of the cell can have the positive electrode 536, the negative electrode 546, and one or more of the separators 520 wound into a "jelly roll" form that is enclosed within the case 502. The "jelly roll" of electrodes can have an outer wrap of separator and/or insulating tape to each of the positive and negative electrode tabs. The internal tab may be taped from the edge of the corresponding current collector to a few mm from the end of the respective tab. As noted, the tape prevents (in the case of the negative electrode tab) the internal tab from contacting the positive electrode or cell case, and (in the case of the positive electrode tab) the positive internal tab from contacting the negative electrode or the cell case. In various embodiments disclosed herein, the components of the cells and the function of the cells may correspond to conventional components and functions as they relate to the jelly roll and header of the cells.

The bottom end of the cell 500 includes a negative electrode tab (not shown) in contact with the case (an area where the negative electrode tab is in contact with an interior surface of the case may correspond to the location of the negative terminal 515 on the case). The case on the bottom side of the cell has a score 504 that encloses, or surrounds, where the negative terminal 515 is located on the case. In embodiments, the score 504 may have a circular shape that fully encloses the area where the negative electrode tab (not shown) connects to the case. Additional illustrative details of the bottom side of the cell 500 are shown and described in relation to FIGS. 2-4 and 6-9, for example, with the configuration of FIG. 5 corresponding in certain aspects to FIGS. 2, 3, and 6.

Assembling the cell can advantageously require minimal changes to conventional manufacturing processes for lithium-ion cells. Main modifications/additions may include the taping of the negative internal tab and/or installation of insulative layer(s). Regarding the taping of the negative electrode tab, given that the positive tab is currently taped, adding a similar process for the negative tab would be relatively simple to implement. As discussed herein, the taping is optional, and all other processes could remain the same. In various embodiments, instead of taping, a coating may be used. For example, an electrically insulative coating may be in contact with the negative electrode tab to prevent the tab from being exposed in areas other than where it is in contact with the case.

The means by which the layers including a complete cell of some embodiments of the present disclosure are assembled into the final working cell are not critical. One skilled in the art will appreciate that a wide diversity of methods for assembling cells, including lithium-ion cells have been disclosed in the art. For the purposes of some embodiments of the present disclosure, any such methods which are compatible with the particular requisites of given embodiments of the present disclosure are suitable.

Figure 6:
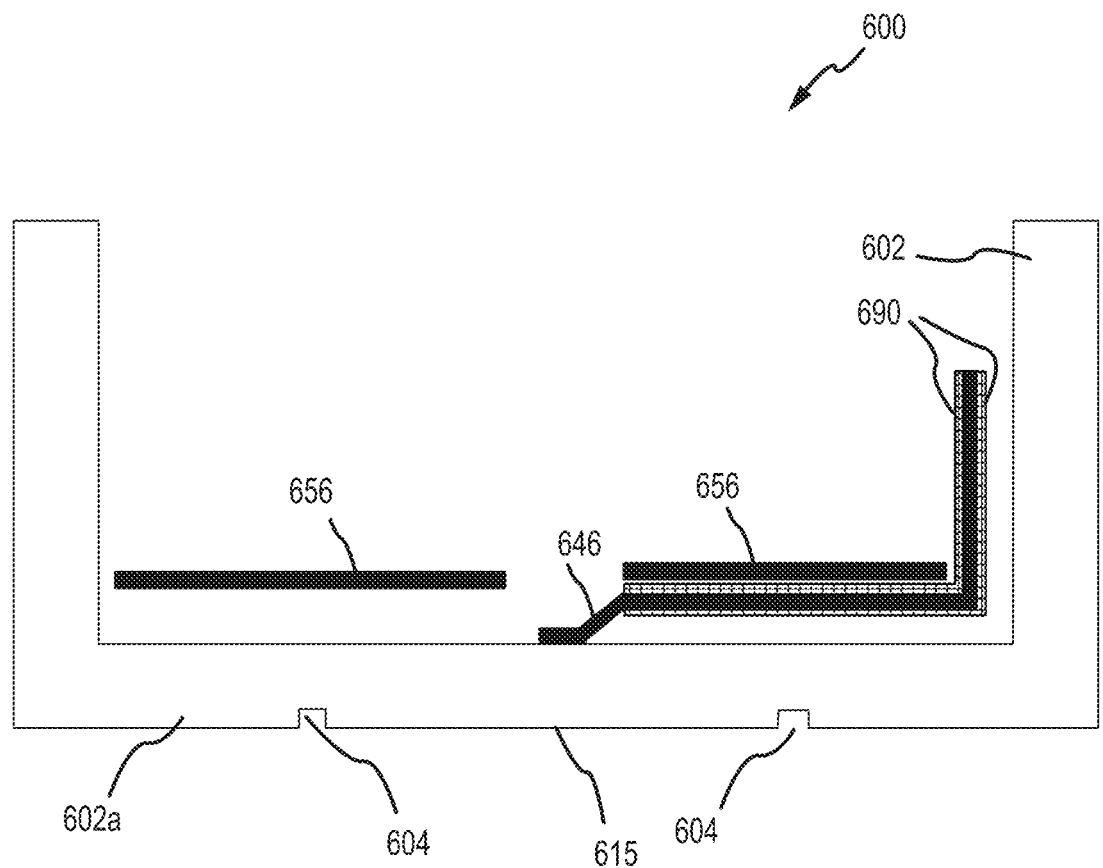
FIG. 6 shows a first detail cross-sectional view of the bottom of a cell in accordance with embodiments of the present disclosure.

FIG. 6 shows a detailed cross-sectional view of the bottom of a cell 600 in accordance with embodiments of the present disclosure. For example, FIG. 6 shows a negative electrode tab 646 that is welded to a negative terminal 615, and a score 604 in the case 602 surrounding a scored area (e.g., the area within the score 604), where the scored area includes the negative terminal 615 (e.g., a location on the case 602 that corresponds to the location where the negative tab 646 is in contact with an internal surface of the case 602). The score 604, for example, may correspond in shape to the score 204 or 304, as shown in FIGS. 2 and 3, respectively. In a similar manner, the scored area may correspond in shape to the scored areas 215 or 315, as shown in FIGS. 2 and 3, respectively.

Also in FIG. 6, embodiments of an electrically insulative tape 690 in contact with the negative electrode tab 646 are shown. The negative electrode tab 646 is electrically connected to the negative terminal 615 and is in electrical contact with the case 602 at the negative terminal 615. Thus, by the use of the insulative tape 690, the negative electrode tab 646 may be prevented from making contact with the case 602, except for an area corresponding to the negative terminal 615, which may be within the scored area within the score 604. Although not shown in FIG. 6, at least a portion of the bottom side of the cell 600 may be connected to a cooling plate (as illustratively shown in FIG. 8).

The electrically insulative tape 690 can be in contact with a front and a back surface of a portion of (or portions of) the negative electrode tab 646, or the electrically insulative tape 690 can enclose portions of the negative electrode tab 646. In some embodiments, the electrically insulative tape 690 can be positioned on any portion of the negative electrode tab such that the electrically insulative tape 690 prevents an electrical connection of the negative electrode tab 646 with the case 602 and/or other components of the cell, such as the positive electrode. A portion of the negative electrode tab 646 is not in contact with the electrically insulative tape 690 where the negative electrode tab 646 is electrically connected to an interior surface of the case 602 at a location that corresponds to the negative terminal 615 (e.g., the negative electrode tab 646 may be connected to the case 602 by resistance welding).

The process to tape the negative electrode tab 646 can be similar to a process that is already performed for the positive electrode tab of the cell 600. Advantages of using a same or similar process and/or materials include the reuse of same manufacturing processes and/or equipment. The electrically insulative tape 690 can be any tape used in relation to conventional positive electrodes of lithium-ion cells; for example, the electrically insulative tape 690 can be a polyimide material (e.g., Kapton®), among others. In various embodiments, the electrically insulative tape 690 is optional.

An insulator 656 is positioned adjacent to a bottom side of the case 602 (except for an area where the negative electrode tab 646 contacts the case 602) and between the jelly roll and the bottom of the can. In various embodiments, the insulator 656 may be provided to electrically insulate the case 602 from other components of the cell. In addition, by the use of the electrically insulative tape 690 and insulator 656, the negative electrode tab 646 may be prevented from making contact with the case 602 or positively charged components, so that the negative electrode tab 646 only makes contact at an area that is within the scored area within the score 604.

In various embodiments, an electrically insulative coating may be used on the negative electrode tab 646 instead of the electrically insulative tape described herein. The electrically insulative coating may be any suitable material (e.g., an epoxy that is resilient to the electrolyte inside the cell), and is not limited by the present disclosure. The electrically insulative coating can be in contact with one or more of front and a back surface of a portion of (or portions of) the negative electrode tab 646, or the electrically insulative coating can enclose portions of the negative electrode tab 646. In some embodiments, the electrically insulative coating can be positioned on any portion of the negative electrode tab such that the electrically insulative coating prevents an electrical connection of the negative electrode tab 646 with the case 602 and/or other components of the cell, such as the positive electrode. A portion of the negative electrode tab 646 is not in contact with the electrically insulative coating where the negative electrode tab 646 is electrically connected to an interior surface of the case 602 at a location that corresponds to the negative terminal 615 (e.g., the negative electrode tab 646 may be connected to the case 602 by resistance welding). For example, an area from about 1 mm to about 5 mm from a location where the negative electrode tab 646 is connected to the case 602 may not be in contact with the electrically insulative coating.

In further embodiments, the electrically insulative coating may be in contact with at least a portion of an interior bottom surface of the case 602 (e.g., the can of the cell), and in additional embodiments, may extend to be in contact with at least a portion of an internal side of the case 602. The electrically insulative coating may be used instead of the electrically insulative tape 690. The electrically insulative coating may be any suitable material (e.g., an epoxy that is resilient to the electrolyte inside the cell), and is not limited by the present disclosure. The electrically insulative coating can be positioned on any portion of an internal surface of the case 602 such that the electrically insulative coating prevents an electrical connection of the negative electrode tab 646 with the case 602, except for an area where the negative electrode tab 646 is connected to the case 602 at the negative terminal 615. Thus, in certain aspects, no electrically insulative tape 690 may be used on the negative electrode tab 646.

In some embodiments, the electrically insulative coating is optional. By the use of the coating, the negative electrode tab 646 may be prevented from making contact with the case 602, except for an area corresponding to the negative terminal 615, which may be within the scored area within the score 604.

The insulator 656 can be any material that is electrically insulative. For example, the insulator 656 at the bottom side of the cell 600 can be the same or similar to any material used conventionally as electrical insulators in cells. The insulator 656 can be made of materials including but not limited to glass, polymer, resin, and ceramics, and combinations thereof. For example, the insulator 656 material can include but is not limited to: polyethylene (PE), polypropylene (PP), polyphenylene sulfide (PPS) resin, polyether ether ketone (PEEK) resin, polychlorotrifluoroethylene (PCTFE), or other polymer materials. In addition, the insulator 656 can be a same material as the insulative tape 690. The insulator 656 can be any configuration and can be any combination of one or more materials and/or layers.

The negative terminal 615 may be a location on the case 602 that corresponds to the end of the negative electrode tab 646; for example, the negative terminal 615 may be at a location on the case 602 where the negative electrode tab 646 is welded to the case 602, such as in the center of the bottom of the case. The case 602 may not have any alterations at the location of the negative terminal 615, or it may be altered (e.g., different from some or all of the remainder of the case 602). For example, the negative terminal 615 may have one or more score marks or scored areas in the case 602 at a location corresponding to the negative terminal 615.

The bottom side of the case 602a may be adjacent to a cooling plate (not shown), and partially or fully connected to the cooling plate. Although it is described herein that the cell(s) may be adhered to a cooling plate, it is to be understood that the cell(s) may be adjacent to, or adhered to, other components of the module. Also, other components may be located between the cell(s) and the cooling plate, or adjacent to the cells and the cooling plate such that the cells are connected to components other than the cooling plate (or in addition to the cooling plate). Further illustrative embodiments of the cells together with a cooling plate are shown and discussed in relation to FIG. 9.

As described herein, the electrical isolation of components of the cell in relation to a bottom side of the case 602 may be advantageous because of events that can cause components of the cell to move. For example, in a crash scenario, when the case 602 of the cell moves relative to other components within the battery module, the negative electrode tab 646 can become disconnected from the case 602, thereby rendering the case 602 neutral. However, the forces of the crash may cause components of the case to come into contact with one another, and the cell may be short circuited when negatively charged components contact positively charged components. In addition, forces of the crash may move the case 602 relative to the negative electrode (and/or other components) such that the negative electrode (and/or other components) may physically contact the case 602. In such situations, the case 602 would remain (or become again) negatively charged in spite of the negative electrode tab 646 not being in contact with the case 602, and due to contact of the case 602 with positively-charged components (e.g., a positive electrode in the jelly roll) the cell may short circuit and overheat. In such a scenario, thermal runaway is a possibility, and the heat generated from the damage to one or more cells may spread to other cells, thereby causing additional problems, such as increased cell failure and dangerous conditions for the battery. However, if the insulative tape 690 and/or insulative layers 656 electrically isolate components of the cell from the case 602 (e.g., such that only the negative electrode tab 646 is in contact with a bottom side of the case 602 even if the cell is deformed), then in a crash scenario where the negative electrode tab 646 becomes disconnected from the case, the case will be electrically isolated from the positively-charged components of the jelly roll (e.g., by the insulative tape 690 and/or insulative layers 656). Thus, short circuiting and overheating (and even thermal runaway) can advantageously be reduced or avoided.

In addition, in an event that causes the cell to move in relation to a surface upon which the cell is adhered (e.g., a cooling plate), the score 604 on the bottom side of the case 602 may advantageously cause the surface of the case 602 on the bottom side of the cell (e.g., at the score 604) to open up, e.g., create a gap and/or fully separate from other parts of the case 602, thereby venting the cell. In additional embodiments, if the cell is experiencing too much gas generation (for example, due to short circuiting or overheating), the score 604 may also advantageously open up to vent the cell due to the buildup of pressure within the cell. Thus, adverse events can include events such as undesirable operating conditions for the cell, or other events that adversely affect the cell, and the scored area(s) may advantageously provide secondary internal current mechanisms (e.g., vents).

If the cell is vented, the venting allows gases and liquids to escape from the cell, also reducing or eliminating the chance of the cell short circuiting or overheating, or proceeding into a thermal runaway state. In some embodiments, the score(s) 604 on the bottom side of the case can only cause a gap in the surface of the case 602, or in other embodiments, a portion of the surface of the case 602 (e.g., a portion of the case 602 that is within the score) may entirely separate from the remainder of the case 602. In such a situation, the portion of the case 602 that separates entirely (e.g., the scored area) may remain adhered to the rigid surface (e.g., a cooling plate) while the other parts of the cell are moved to a different location relative to the rigid surface. In either situation, the score 604 may advantageously allow the cell to vent. Also, the movement of the scored area may advantageously separate the negative electrode tab 646 from electrical contact with areas of the case 602 that are not within a scored area, which would remove the negative charge from the case 602.

When a cell suffers an adverse physical event (such as being dislodged from a cooling plate) and one or more scores 604 are opened, it is possible that the negative electrode tab 646 may protrude from one of the openings created via the score(s) 604. Advantageously, in various embodiments of the present disclosure, the insulative tape 690 and/or the insulator 656 may electrically separate negatively charged components (e.g., the negative electrode tab 646) from other cell components. For example, separating the negatively charged components from other cell components could prevent those other components from becoming negatively charged or could prevent the negatively charged components from contacting any positively charged components either within the cell itself or of other cells. In some embodiments described herein, the taping and/or use of electrically insulative layers/materials at the anode side of the case (e.g., the bottom side) may be similar to processes (and use similar materials) as what is conventionally done for a positive electrode tab of the cell. Thus, advantageously, such methods and systems described herein may be easier and less costly to implement.

Another problem is that, in some aspects, heat may not be generated in the cell due to an abusive event and an internal disconnect mechanism may therefore not be activated. As an example, if an internal disconnect mechanism is not activated (e.g., the case remains at a negative charge) and any cells within the module are jarred loose by a mechanical impact, it is likely that the negatively charged case will contact positively-charged elements of other cells, thereby resulting in multiple cells being exposed to an external short circuit scenario where the cells would overheat and may experience thermal runaway and possible rupturing or explosion. This could be an additional problem to having cells be deformed due to a mechanical impact where the electrodes may short together and cause the electrolyte to boil, gases to generate, and the cell to proceed to thermal runaway and possible rupturing or explosion.

However, in various embodiments of the present disclosure, upon a physical impact to a module, one or more cells could be rendered neutral (with respect to their charge) within the module if a vent were opened in the cell case and/or the negative electrode tab were disconnected from the case due to the scoring and adhering of the cells to the cooling plate. Thus, one or more neutral cells could be scattered (perhaps in a grouped arrangement, or perhaps in a haphazard arrangement) inside the module after the physical impact occurs. In addition, venting could advantageously cause removal of electrolyte from within the case and reaction of the anode with ambient air to increase the internal cell resistance and decrease any ability for ion-transfer between components in the cell. This would reduce short circuit currents in the event of a cell being externally shorted.

Figure 7:
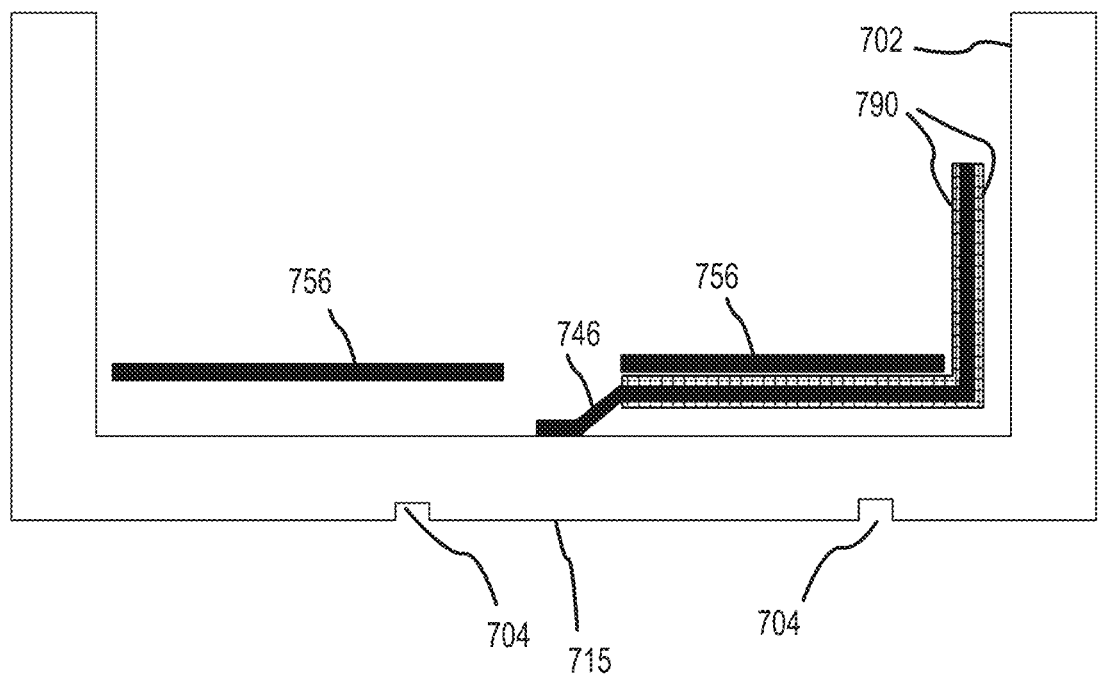
FIG. 7 shows a second detail cross-sectional view of the bottom of a cell in accordance with embodiments of the present disclosure.

FIG. 7 shows a second detailed cross-sectional view of the bottom of a cell in accordance with embodiments of the present disclosure. In FIG. 7, a negative electrode (not shown) is connected to a negative electrode tab 746 that is welded to a negative terminal 715 of a case 702, and the case 702 has a score 704 (which may include one or more scores) in an area that is different than an area of the negative terminal 715. In various embodiments, the score 704 may correspond in shape to the score 404 as shown in FIG. 4 and enclose an area of the case that includes the negative terminal 715. In other embodiments, the score 704 may be a shape or size that is different than that shown in FIG. 4.

Also in FIG. 7, embodiments of an electrically insulative tape 790 in contact with the negative electrode tab 746 are shown. The negative electrode tab 746 is electrically connected to the negative terminal 715 and is thereby in electrical contact with the case 702. An insulator 756 is positioned adjacent to a bottom side of the case 702 (except for an area where the negative electrode tab 746 contacts the case 702) and between the jelly roll and the bottom of the can. In some embodiments, the negative electrode tab 746, the tape 790, and the insulator 756 may be similar to, or the same as, the corresponding components shown and described in relation to FIG. 6.

As discussed herein, the score 704 may any configuration, including any size or shape. The score 704 may be a semi-circular shape surrounding a location of the negative terminal 715 (e.g., in a size and/or in a shape and/or at a location where, in a crash scenario, the score 704 would increase a likelihood that the negative electrode tab 746 would electrically separate from the case 702). Also, the score 704 may be located at any position on the cell, such as extending from a bottom surface of the cell to a side surface of the cell, and may have a configuration that increases the likelihood that the score will vent the cell in the circumstance of an undesirable event. For example, a half-moon shape or other shape may reduce the amount of force required to open the score, depending on the direction of the force.

The electrical isolation of components of the cell in relation to a bottom side of the case 702 may be advantageous because of events that can cause components of the cell to move. For example, in a crash scenario, when the case 702 of the cell moves relative to other components within the battery module, the negative electrode tab 746 can become disconnected from the case 702 and the when the score 704 opens up. Also, due to the crash scenario, if the negative electrode (and/or other components) become positioned to be in physical contact with the case 702, such physical contact may advantageously be prevented or reduced by the positioning of the insulative tape 790 and/or insulator 756 that electrically isolate components of the cell from the case 702.

Due to one or more of the disconnection of the negative electrode tab 746, the opening of the score 704, and the electrical isolation of the case 702 from other components of the cell by the use of the insulative tape 790, chances of the cell short circuiting and overheating (or entering thermal runaway) can advantageously be reduced or eliminated. This is possible due to the improved secondary current mechanisms of the cell, such as the improved venting/opening of the case and the improved electrical isolation of components within the case.

Figure 8:
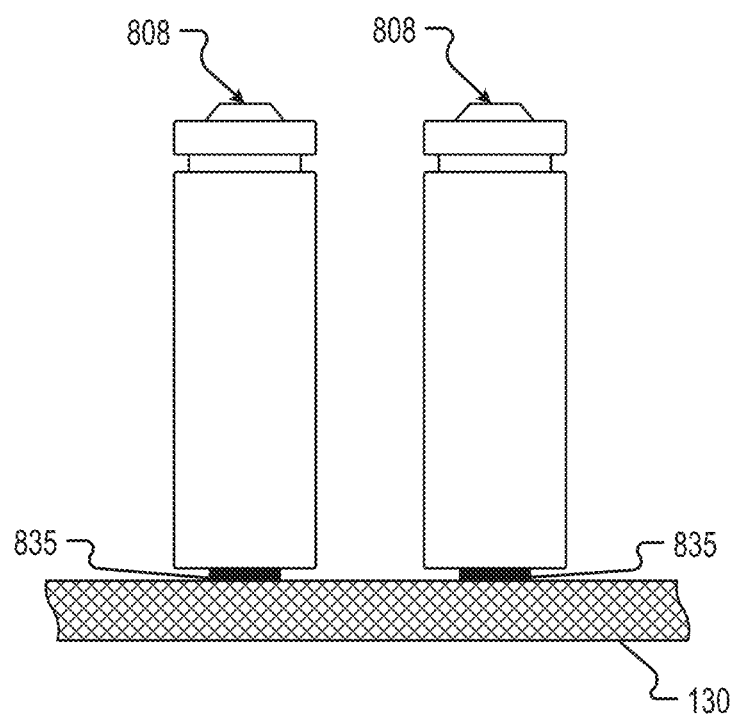
FIG. 8 shows a side view of cells in a configuration in accordance with embodiments of the present disclosure.

FIG. 8 shows a side view of cells in a configuration in accordance with embodiments of the present disclosure. In FIG. 8, cells 808 are connected to cooling plate 130 via adhesive 835. As discussed herein, the cooling plate 130 does not need to be a cooling plate and may be any other one or more components of the battery module. Also, any portion of cells 808 may be adhered to the cooling plate 130. For example, one or more portions of the bottom sides of the cells 808 may be adhered to, or alternatively not adhered to, the cooling plate 130. Portions of the cells 808 may be in contact with, but not adhered to, the cooling plate 130.

In some aspects, only areas within scored areas on the bottom sides of the cells 808 may be adhered to the cooling plate 130 (e.g., only scored areas 215/315 (as in FIGS. 2 and 3, respectively) may be adhered to a cooling plate while areas on the bottom sides of the cells that are outside of scored areas 215/315 are not adhered to the cooling plate). In other aspects, areas within scored areas on the bottom sides of the cells 808 may be adhered to the cooling plate 130, and some or all of areas on the bottom sides of the cells 808 that are not within any scored areas may also be adhered to the cooling plate 130. The adhesive may only be present on surfaces of the cells 808, or the adhesive may be present on surfaces that correspond to the voids between cells. The inventors have found that even if an entire bottom side of a cell is adhered to a cooling plate (e.g., a scored area in addition to areas outside of the scored area at the bottom side of the cell), in an abusive event, the score(s) may still advantageously create a vent and/or disconnect a negative electrode tab as described herein. Methods and components for connecting a cell to a cooling plate are not limited by this disclosure and can include the use of any type of adhesive, including glue and tape. In some aspects, adhering the cells to the cooling plate may provide additional advantages, which can include being able to better pack cells within a module (e.g., by having less space between the cells, having a greater speed and/or efficiency at packing the cells such as by using less process steps, and having an improved ability to customize the configuration of the cells within the module).

In certain aspects, portions or all of the bottom side of the cells may be adhered to the cooling plate using one or more adhesives. Such an adhesive may be in any form, including a liquid adhesive such as a glue. Some liquid adhesives may advantageously create a fillet on the bottom of the cell, which can improve structural performance (e.g., versus a tape adhesive). Adhesives that may be used in various embodiments described herein can have various properties and are not limited by this disclosure.

Adhesive(s) that can be used may advantageously not require heat to cure, and may have thermal conductivity, a sufficient and/or high bond strength, and electrically insulative properties. The adhesive(s) could be any adhesive with one or more of the following properties, such as a film having a hardness of typically about 65-85 Shore D, a lap shear strength of typically about 1,500-4,500 psi, a tensile strength of typically about 1,000-3,500 psi, and an elongation of typically about 2%-80%. The adhesive may advantageously provide high thermal conductivity to dissipate heat between the cell(s) and the cooling plate while providing a strong bond to the cooling plate. The adhesive may advantageously have a broad temperature range so that it is not affected by the cell(s)'s operating temperature, have a low coefficient of thermal expansion to reduce the possibility of cracking of the glue or movement of the score(s) during use, may be electrically isolative to reduce any likelihood of short circuiting of the cell(s), and may be UL rated to provide flame retardancy benefits. Further, the adhesive may be used with one or more other materials that have advantageous properties, such as being electrically insulative.

For example, an adhesive that may be used includes an adhesive that may be a film having a hardness of 80 Shore D at about 75° F., 27 Shore D at about 212° F., and 22 Shore D at about 350° F.; a tensile strength of about 2,000-3,000 psi at about 75° F.; a tensile lap shear strength of about 4,000-4,400 psi at about 75° F.; an elongation of greater than about 50% at about 75° F.; a glass transition temperature of about 30° C.; a thermal conductivity of about 9-10 BTU·in/ft$^2$·hr·° F.; a coefficient of thermal expansion of about 75-85×10$^{-6}$ in/in/° C. at about 75° F.; a dielectric constant of about 4.1 at about 75° F. and 60 Hz; a volume resistivity of greater than about 10$^{14}$ ohm·cm; a service temperature range of about –100° F. to +500° F.; and a shelf life of at least six months at about 75° F. Film adhesives may be available in various sizes and shapes, such as 4×4 ×0.008 inches or 8×8×0.008 inches, and may be cut to size. In certain aspects, the adhesives of the present disclosure may not require a temperature of above about 60° C. to cure, and may use other methods of curing.

An adhesive to connect at least a portion of the bottom side of the cells to a rigid element may have a lap shear strength that is strong enough to break (e.g., separate two areas of) a cell case at a score in the case during an adverse physical event. Illustrative lap shear strengths of materials of the adhesive include, at 25° C., typically from about 1800 psi to about 2800 psi, typically from about 2000 psi to about 2600 psi, typically from about 2100 psi to about 2500 psi, typically from about 2200 psi to about 2400 psi, and more typically about 2300 psi.

The adhesive may have a thermal conductivity that allows heat transfer to the cooling plate from the cells. Illustrative thermal conductivities of materials of the adhesive include typically from about 0.70 W/mK to about 1.30 W/mK, typically from about 0.80 W/mK to about 1.20 W/mK, typically from about 0.850 W/mK to about 1.150 W/mK, typically from about 0.90 W/mK to about 1.10 W/mK, typically from about 0.950 W/mK to about 1.050 W/mK, and more typically about 1.00 W/mK.

An illustrative example of an adhesive that may be used is Bond-Ply®800, which is a thermally conductive, fiberglass reinforced pressure sensitive adhesive tape that has a high bond strength to most epoxies and metals. It has a thermal impedance of about 0.60° C.-in$^2$/W at about 50 psi, a reinforcement carrier of fiberglass, a thickness of about 0.127 to about 0.203 (using test method ASTM D374), an elongation of about 70% at about 45° C. to warp and fill (using test method ASTM D412), a tensile strength of about 10 MPa (using test method ASTM D412), a Coefficient of Thermal Expansion (CTE) of 600 um/m-° C. for a Continuous Use Temperature of –40° C. to +125° C., a lap shear adhesion of 1.0 MPa at room temperature (using test method ASTM D1002), a dielectric breakdown voltage of 4000 Vac for a 0.005 in thick sample (using test method ASTM D149), a dielectric breakdown voltage of 6000 Vac for a 0.008 in thick sample (using test method ASTM D149), a dielectric constant of 4.0 at 1000 Hz (using test method ASTM D150), a volume resistivity of 10$^{11}$ Ohm-meter (using test method ASTM D257), a flame rating of V-O for test method U.L. 94, and a thermal conductivity of 0.8 W/m-K (using test method ASTM D5470). In various embodiments, a liquid adhesive may provide more advantageous properties than an adhesive tape, such as an improved bond strength.

Another illustrative example of an adhesive that may be used is CoolTherm™ TC-2002 Thermally Conductive Structural Adhesive ("TC-2002 Adhesive"). The TC-2002 Adhesive is a two-component adhesive system designed for use in structural bonding applications that require thermal conductivity with high bond strength. The first component may include about 15% to about 20% tetrahydrofurfuryl methacrylate, about 1% to about 5% methacrylic acid, and about 0.9% methyl methacrylate. The second component may include about 45% to about 50% of a proprietary epoxy resin, about 10% to about 15% of benzoyl peroxide, and about 1% to about 5% of titanium dioxide. The TC-2002 Adhesive has a thermal conductivity of 1.0 W/mK, a broad temperature range (it can be used on devices that have operating temperature from about –65° C. to 100° C.), a low coefficient of thermal expansion, is UL rated (with a UL 94 V-0 certification pending), and is electrically isolative. The TC-2002 Adhesive has a hardness of 73 for Shore D, a lap shear strength of 2300 psi at 25° C. for aluminum, an elongation at break of 5%, and a dielectric strength of 19.0 kV/mm.

In some embodiments, one or more other layers/materials may be present between the adhesive and the cooling plate. For example, a material may be used that mitigates issues caused by using a liquid adhesive, such as to improve the electrical insulation between the cell and the cooling plate. In certain aspects, the layer may be a coating layer in direct contact with the cooling plate and positioned between the liquid adhesive and the cooling plate that functions to improve the electrical insulation between the cell and the cooling plate (e.g., the coating layer may be electrically insulating). In particular, bubbles may form in the adhesive that cause air pockets within the adhesive when it is cured, and these air pockets may allow electricity to conduct between the cell and the cooling plate. However, if a coating layer is positioned between the adhesive and the cooling plate, the coating layer may advantageously improve the electrical insulation by providing an electrically insulative layer at locations of the air bubbles in the adhesive. In various embodiments, even if the coating layer has air pockets itself, it may still provide sufficient electrical insulation because it can be very unlikely that the air pockets in the adhesive would line up with the air pockets or discontinuities in the coating layer in such a manner that the layers would allow electrical conduction. In various aspects, it may be advantageous for such layers/materials to be electrically insulative, thermally conductive, and have sufficient adhesion properties. The coating layer(s) may include a material such as IsoEdge™ PR4305 Heat Plate. However, the present disclosure does not limit the types and configurations of the additional layers/materials that can be used in embodiments described herein.

By way of example, IsoEdge™ PR4305 Heat Plate is a dielectric coated metal substrate that may be placed as a thin coating on the cooling plate 130 and provides desirable thermal conductivity and electrical isolation properties between the cells 808 and the cooling plate 130. IsoEdge™ PR4305 Heat Plate has a dielectric strength of 650 VAC/mil (per ASTM D149), a thermal impedance of 2.2° C./W (using a TO-220 test method), can have a thickness of 0.004-0.010 of an inch (0.102-0.254 of a mm), a flame rating of V0 (as tested per UL 94), a permittivity (dielectric constant) of 6 (per ASTM D150), and a thermal conductivity of 0.6 W/mK (per ASTM D5470).

Thus, upon receiving a physical impact which would dislodge one or more of the cells 808 from its position in the module (e.g., in a crash situation), the cells 808 may have one or more portions of their bottom surfaces of their cases torn off as the adhesive 835 adheres to a score or a scored area. Such a result can tear the case and thereby disconnect an internal negative electrode tab from remainder of the case and vent the cell, as shown by way of example in FIG. 9. In various embodiments, it may be advantageous to apply adhesive only to a score and/or scored area to promote an opening of the case. In other embodiments, it may be advantageous to adhere an entire bottom surface of the cases of the cells 808 to the cooling plate 130 (e.g., to more quickly assemble components or manufacture the module as discussed herein). In some embodiments, the adhesive may cover an entire surface area of the rigid structure, or any other layers/materials on the rigid structure. The connection of the cells to the rigid structure and the use of adhesive(s) and any other materials/layers may be referred to herein as secondary internal current mechanisms.

In various embodiments disclosed herein, in an abusive event scenario that causes one or more of the cells to be moved with respect to their position on the cooling plate, one or more of the cells may become dislodged by the force/movement and the movement of the cell(s) may cause any scored areas (or portions thereof) to separate (e.g., open up or create a gap) from the cases of the cell(s). When the scored area(s) separate/open, if the negative terminal is located at or within a scored area, the negative electrode tab may advantageously be separated or torn thereby disconnecting the electrical charge of the negative electrode from the case, rendering the case neutral. In some aspects, one or more of the scored area(s) may not fully separate from the remainder of the case, and one or more of the scores may only create a hole/gap in the case. If there is more than one scored area, or score, on the bottom of a cell, only some of the scored areas may open and/or entirely separate from the case. If the scored area(s) do not entirely separate from the case, the creation of any gaps/holes in the case (e.g., any separation of the scored area(s)) advantageously vents the cell(s), allowing gases and liquids to escape from the cell(s). When the cell(s) vent, flammable gasses and electrolyte can escape from the cells to decrease or preventing the occurrence of any disadvantageous thermal events due to short circuiting or overheating of the damaged cell(s) or neighboring cell(s). Such a creation of any gaps/holes in the case or any separation of the scored area(s) may be referred to herein as secondary internal current mechanisms. Further, movement of a score and/or a scored area can break the score and cause the break to act as a vent to the cell and/or disconnect negatively charged components from the case, and this may be referred to herein as secondary internal current mechanisms.

Figure 9:
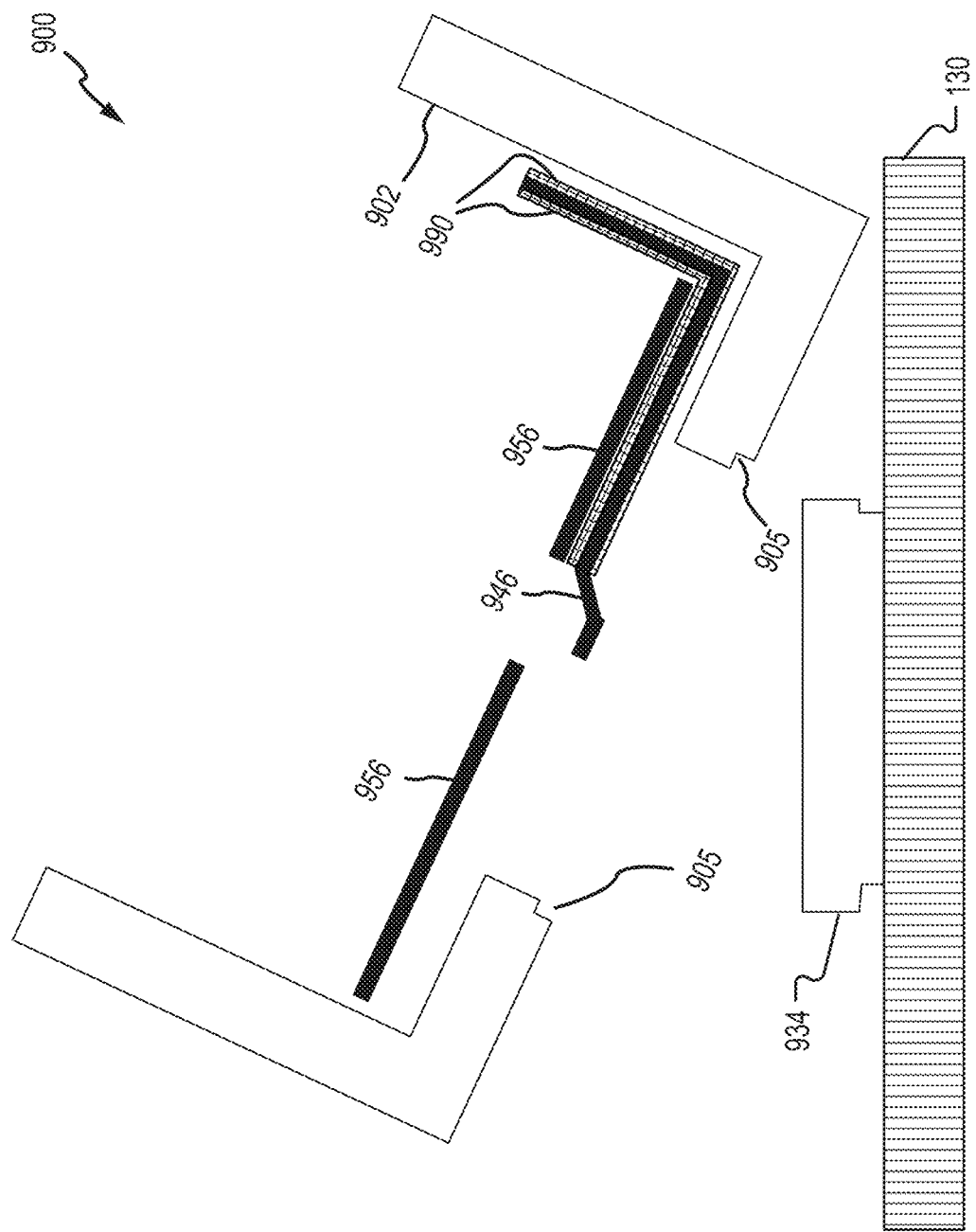
FIG. 9 shows a third detail cross-sectional view of the bottom of a cell in accordance with embodiments of the present disclosure.

FIG. 9 shows a third detail cross-sectional view of the bottom of a cell 900 in accordance with embodiments of the present disclosure. In FIG. 9, the cell case 902 has been dislodged from the cooling plate 130. FIG. 9 shows the negative electrode tab 946 is within a hole in the case that has been created at broken score marks 905. A portion of the case 934 that was previously within score marks remains adhered to the cooling plate 130. Prior to the cell case 902 becoming dislodged as shown in FIG. 9, the negative electrode tab 946 was connected to a negative terminal located on the portion of the case 934 that remains adhered to the cooling plate 130.

In various embodiments, the components shown in FIG. 9 may correspond to those shown in FIGS. 2, 3, and 6. For example, the portion of the case 934 may correspond in shape to the scored areas 215 and 315, as shown in FIGS. 2 and 3 respectively. Also, the broken score marks 905 may correspond to the score 204 and 304, as shown in FIGS. 2 and 3 respectively. Further, in various embodiments, the components shown in FIG. 9 correspond to the similar components shown and described in relation to FIG. 6.

As shown in FIG. 9, the negative electrode tab 946 (which may be broken after the cell is dislodged) is within a hole in the case that has been created at broken score marks 905. After an event such as a physical impact, the negative electrode tab 946 (or a portion of the tab, if the tab has broken due to the event) may be within, or protrude from, an opening created via at broken score marks 905. Once the negative electrode tab 946 is separated from the case 902 (e.g., by separating from the negative terminal/case and/or by breaking the tab), the case becomes neutral and it cannot short with any positively charged components that it contacts (e.g., any positively charged components within the cell, or any exposed positive header of another, adjacent cell). However, problems can occur if the exposed negative electrode tab 946 contact another area of the case because this would make the case negatively charged once again. In other words, without the insulative tape 990, the negative electrode tab 946 may be able to move around, or may have been moved due to the event, and may contact portions of the case 902 other than the removed portion 934. If the negative electrode tab 946 contacts the case 902, the case 902 would become negatively charged, and would cause short circuiting and possible overheating (which may affect other cells) if it were to contact positively charged components.

However, as shown in FIG. 9, the negative electrode tab 946 is advantageously at least partially electrically insulated by the insulative tape 990 and/or the insulator 956. Therefore, advantageously, in various embodiments of the present disclosure, the insulative tape 990 and/or the insulator 956 electrically separate negatively charged components (e.g., the negative electrode inside the electrode winding (not shown) and possibly the case 902) from positively charged components either within the cell itself (e.g., the positive electrode (not shown)) or within other cells (e.g., positively charged headers, crimps, etc.), thereby preventing any negatively charged components broken negative electrode tab 946) from contacting positively charged components. The use and configurations of the insulative tape 990 and/or the insulator 956 may be a part of the secondary internal current mechanisms described herein. Thus, the secondary internal current mechanisms as described herein can provide a safer battery module and battery because it is less likely that a single cell will be damaged to the extent that it would cause a thermal event or a non-passive failure in the battery module.

Figure 10:
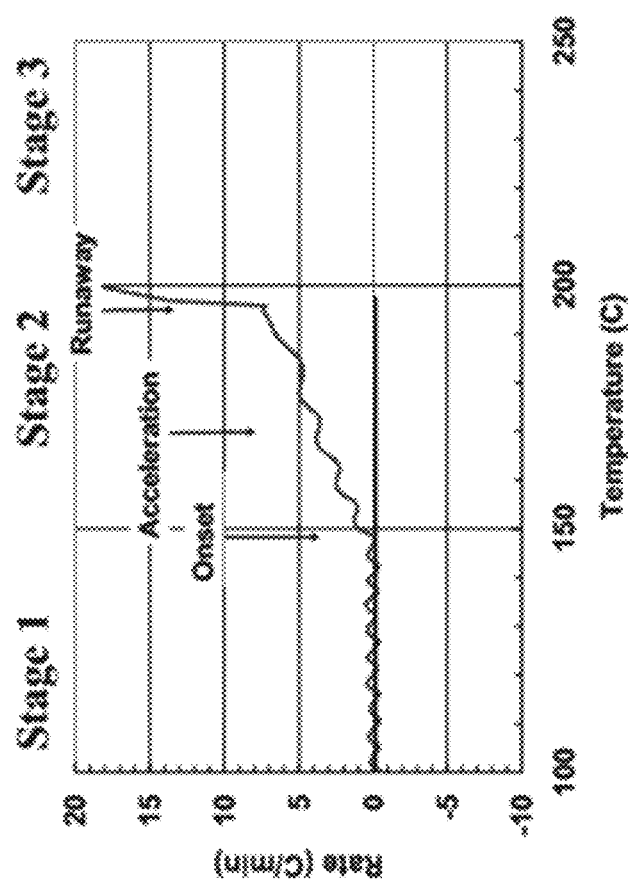
FIG. 10 is a chart showing illustrative cell heating rates for a cell in accordance with embodiments of the present disclosure.

FIG. 10 is a chart showing illustrative cell heating rates for a cell in accordance with embodiments of the present disclosure. In various embodiments, FIG. 10 shows temperatures and rates of change of the temperature of a cell during thermal runaway. As described herein, adverse events for a cell (including overheating and short circuiting) may lead to an occurrence of thermal runaway.

Thermal runaway may be said to occur in various stages, for example three stages. In Stage 1, a protective layer on the anode (e.g., the Solid Electrolyte Interface (SEI) layer) begins to break down around 100'C resulting in low-rate heat generation. During Stage 1, the temperature becomes more variable and may increase to about 150° C., and the rate may not exceed 3° C./min. Stage 1 may be said to last from about 100° C. to about 150° C.

During Stage 2, at around 150° C., oxidation reactions on the cathode surface (which has a higher-rate heat generation than the SEI layer) begin to occur, breaking down the cathode components. Also, at approximately 150° C.-160° C., the electrolyte starts breaking down into various decomposition gases. With the increase in decomposition gases, increased pressure may open safety vents in the header and cell bottom and the remaining electrolyte may be released from the cell. At this point, most or all of the electrolyte may be in the form of an aerosol when it is released. The decomposition gas mixture and the electrolyte aerosol are highly flammable in the presence of any ignition source, or they may even spontaneously combust depending on the gas mixture. Stage 2 may be said to last from about 150° C. to about 180° C. or 200° C.

At Stage 3, the cathode particles further break down and release oxygen, which reacts with the electrolyte creating significant heat generation. At Stage 3, the significant heat generation is said to be thermal runaway. In most cases, once the cathode particles break down to release oxygen and the cell temperature reaches above 180° C., it is very likely that thermal runaway will occur. Stage 3 may be said to be above about 180° C. or 200° C. Once thermal runaway occurs, the cell may explode and the thermal runaway may propagate within the module, spreading to adjacent cells and further damaging the module.

Thus, safety features to prevent or reduce the likelihood of short circuiting, overheating, and thermal runaway are important. If a cell short circuits or overheats, the cell may enter thermal runaway and the heat can cause neighboring cells to overheat thereby propagating the overheating throughout the battery module. Overheated battery modules can create a domino effect, producing more and more heat, and the battery can explode. Thus, even if the damage from one cell does not affect the entire battery module, it is important to reduce or eliminate the likelihood that a cell will overheat.

At least some benefits of the embodiments described herein relate to the reduced likelihood of a cell overheating. For example, in various embodiments disclosed herein, opening one or more bottom vents (e.g., via score(s)) at ambient temperature releases the electrolyte and any gases within the cell. In the process of releasing the electrolyte and any initial gases formed before and during Stage 1 (e.g., the SEI break down stage), the cell will be cooled. The cooling effect due to the release of electrolyte and gases can advantageously assist in preventing the cell from reaching a more dangerous state such as Stage 2.

Figure 11:
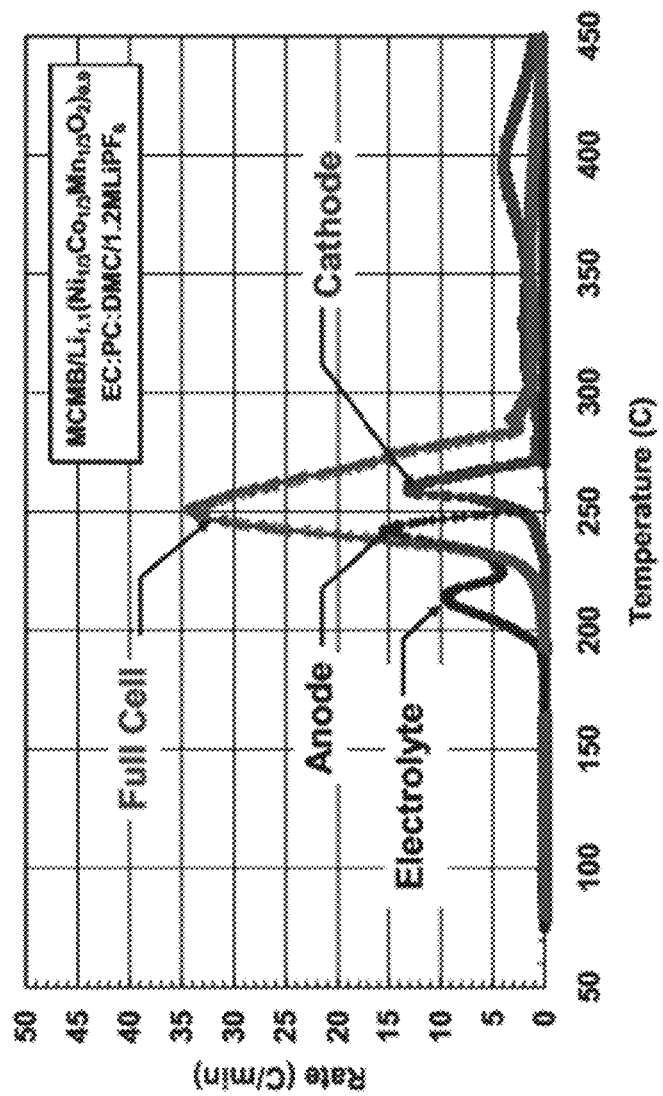
FIG. 11 is a chart showing illustrative measurements of properties of cell components using Differential Scanning calorimetry in accordance with embodiments of the present disclosure.

FIG. 11 is a chart showing illustrative measurements of properties of cell components using Differential Scanning calorimeter (DSC) in accordance with embodiments of the present disclosure. In FIG. 11, DSC profiles are shown for a full 18650 Gen3 cell, and individual electrode cell components (e.g., the anode, cathode, and electrolyte) as sealed in 18650 cans with an EC:PC:DMC/LiPF$_6$ electrolyte, are shown.

As shown in FIG. 11, the electrolyte reaches a higher rate of temperature change (e.g., a spike in the rate of temperature change) at a lower temperature than either the anode or cathode, and the anode reaches a higher rate of temperature change at a lower temperature than the cathode. As the anode heats up, the rate of temperature change of the overall cell begins to spike, and the rate of temperature change of the overall cell continues to increase as the rate of temperature change of the cathode spikes. In the embodiments of FIG. 11, the cell may enter thermal runaway at about 250° C. or 260° C.

Figure 12:
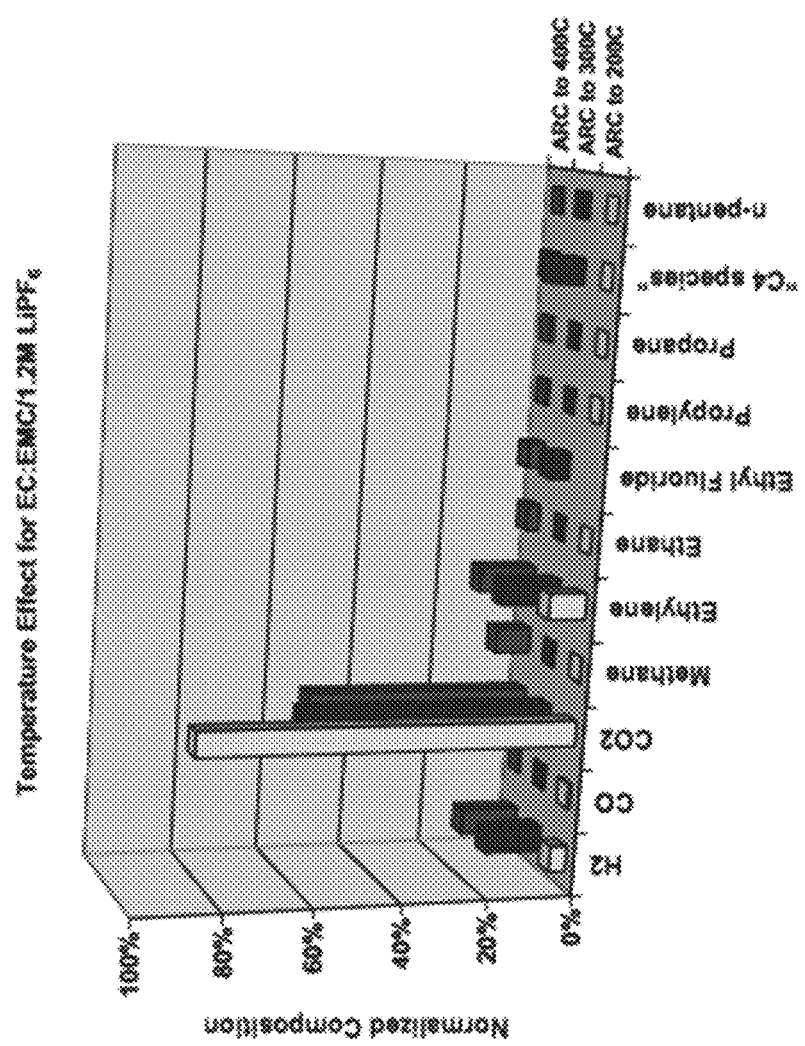
FIG. 12 is a chart showing illustrative chemical compositions at various temperatures of a cell using Accelerated Rate calorimeter (ARC) in accordance with embodiments of the present disclosure.

FIG. 12 is a chart showing illustrative chemical compositions at various temperatures of a cell using (Accelerated Rate calorimetry) ARC in accordance with embodiments of the present disclosure. In FIG. 12, the electrolyte is an EC:EMC/1.2M LiPF$_6$ electrolyte and the chemical compositions are listed at the bottom of the figure for each of ARC to 200° C., ARC to 300° C., and ARC to 400° C. The normalized composition is shown as a percentage along the vertical axis.

The exemplary systems and methods of this disclosure have been described in relation to a battery module and a number of battery cells in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. While the present disclosure describes configurations of cells and modules, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an electrochemical cell, comprising: a positive electrode comprising a positive electrode active material in electrically conductive contact with a positive electrode current collector; a negative electrode comprising a negative electrode active material in electrically conductive contact with a negative electrode current collector and a negative electrode tab including a first attachment end and a second attachment end; an electrically insulative and ion conductive medium in ionically conductive contact with the positive electrode and the negative electrode, wherein the ionically conductive medium comprises an ion conductive layer and an electrolyte; and an outer case containing the positive electrode, negative electrode and electrically insulative and ion conductive medium, wherein the outer case comprises a scored area connected to a cooling plate, wherein the first attachment end of the negative electrode tab is connected to the negative electrode current collector and the second attachment end of the negative electrode tab is connected to an internal bottom of the outer case in an area within the scored area, and wherein an electrically insulative tape is adhered on both sides of an exposed portion of the negative electrode tab except at an attached portion of the second attachment end where the attached portion is connected to the internal bottom of the outer case.

Aspects of the above electrochemical cell include wherein the scored area is connected to the cooling plate by an electrically insulating adhesive. Aspects of the above electrochemical cell include wherein the scored area is at least partially adhered to the cooling plate, and wherein a non-scored area on the bottom side is not adhered to the cooling plate. Aspects of the above electrochemical cell include wherein an electrically insulating layer is positioned between the adhesive and the cooling plate. Aspects of the above electrochemical cell include wherein the scored area is a circular shape, and wherein the scored area is at least partially adhered to the cooling plate with an electrically insulating adhesive. Aspects of the above electrochemical cell include wherein each of the scored area and a non-scored area that is outside of the scored area on the bottom side are at least partially adhered to the cooling plate. Aspects of the above electrochemical cell include wherein an area on the bottom side that is outside of the scored area is not adhered to the cooling plate with the electrically insulating adhesive. Aspects of the above electrochemical cell include wherein the electrically insulating adhesive has a lap shear strength of about 1,500 psi to about 4,500 psi and a tensile strength of about 1,000 to about 3,500 psi. Aspects of the above electrochemical cell include wherein when a physical force is applied to the electrochemical cell, the scored area breaks from an area outside of the scored area on the electrochemical cell prior to the scored area breaking from the cooling plate. Aspects of the above electrochemical cell include wherein when a physical force is applied to the electrochemical cell, the scored area breaks from the non-scored area prior to the scored area breaking from the cooling plate. Aspects of the above electrochemical cell include wherein the connection to the cooling plate is by an electrically insulating adhesive. Aspects of the above electrochemical cell include wherein an area on the bottom side that is outside of the scored area is not adhered to the cooling plate with the electrically insulating adhesive. Aspects of the above electrochemical cell include wherein when a physical force is applied to the electrochemical cell, the scored area breaks from an area outside of the scored area on the electrochemical cell to form an opening between the scored area and the area outside of the scored area on the electrochemical cell.

Embodiments include an energy storage device, comprising: at least one electrochemical cell, comprising: a positive electrode comprising a positive electrode active material in electrically conductive contact with a positive electrode current collector; a negative electrode comprising a negative electrode active material in electrically conductive contact with a negative electrode current collector and a negative electrode tab including a first attachment end and a second attachment end; an electrically insulative and ion conductive medium in ionically conductive contact with the positive electrode and the negative electrode, wherein the ionically conductive medium comprises an ion conductive layer and an electrolyte; and an outer case containing the positive electrode, negative electrode and electrically insulative and ion conductive medium, wherein the outer case comprises a scored area rigidly connected to a cooling plate, and wherein the first attachment end of the negative electrode tab is connected to the negative electrode current collector and the second attachment end of the negative electrode tab is connected to an internal bottom of the outer case within the scored area.

Aspects of the above electrochemical cell include wherein the negative electrode tab is welded to the internal bottom of the outer case. Aspects of the above electrochemical cell include wherein the negative electrode tab is at least partially adhered to the internal bottom of the outer case using an electrically insulative adhesive. Aspects of the above electrochemical cell further comprise an electrically insulative tape that is adhered on both sides of the negative electrode tab except at a welded area on the negative electrode tab where it is welded to the internal bottom of the outer case Aspects of the above electrochemical cell include wherein when a physical force is applied to the at least one electrochemical cell, the scored area breaks from an area outside of the scored area on the at least one electrochemical cell prior to the scored area breaking from the cooling plate. Aspects of the above electrochemical cell include wherein an area of the negative electrode tab that is not in contact with the electrically insulative tape is only adjacent to a portion of the area inside the scored area. Aspects of the above electrochemical cell include wherein when a physical force is applied to the at least one electrochemical cell, the scored area breaks from an area outside of the scored area to form an opening between the scored area and the area outside of the scored area on the electrochemical cell. Aspects of the above electrochemical cell further include an electrically insulative coating that is adhered on at least a portion of an internal surface of the outer case, wherein the electrically insulative coating is between an exposed portion of the negative electrode tab and the internal surface of the outer case.

Embodiments include an energy storage device, comprising: at least one electrochemical cell, comprising: a positive electrode comprising a positive electrode active material in electrically conductive contact with a positive electrode current collector; a negative electrode comprising a negative electrode active material in electrically conductive contact with a negative electrode current collector; an electrically insulative and ion conductive medium in ionically conductive contact with the positive electrode and the negative electrode, wherein the ionically conductive medium comprises an ion conductive layer and an electrolyte; and an outer case containing the positive electrode, negative electrode and electrically insulative and ion conductive medium, wherein the outer case is adhered to a cooling plate.

Aspects of the above electrochemical cell include wherein the outer case is adhered using an electrically insulating liquid adhesive. Aspects of the above electrochemical cell further comprise an electrically insulating coating layer between the electrically insulating liquid adhesive and the cooling plate. Aspects of the above electrochemical cell include wherein the coating layer decreases an electrical conductivity between the liquid adhesive and the cooling plate. Aspects of the above electrochemical cell further comprise a negative electrode tab including a first attachment end and a second attachment end, wherein the first attachment end of the negative electrode tab is connected to the negative electrode current collector and the second attachment end of the negative electrode tab is connected to an internal bottom of the outer case in a same area where the outer case is adhered to the cooling plate, and an electrically insulating coating adhered to an exposed portion of the negative electrode tab except at an attached portion of the second attachment end where the attached portion is connected to the internal bottom of the outer case.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The present disclosure is not limited in its application to the details of construction and the arrangement of components set forth in the description herein or illustrated in the drawings. The disclosure is capable of other embodiments and of being practiced or of being carried out in various ways. Also, it is to be understood that the phraseology and terminology used herein is for the purpose of description and should not be regarded as limiting. The present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The term "adhesive" refers to any substance applied to one surface, or both surfaces, of two separate items that binds them together and resists their separation. The adhesive may be non-reactive (e.g., drying, pressure sensitive, contact, or hot) or reactive (e.g., multi-part, pre-mixed, frozen, or one-part) and may be natural or synthetic. It can rely on one or more mechanisms of adhesion, such as a mechanical mechanism and/or chemical mechanism. The surface(s) to be bonded may be activated prior to adhesive application by any surface activation technique, such as plasma activation, flame treatment, and wet chemistry priming.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. An electrochemical cell, comprising:
    a positive electrode comprising a positive electrode active material in electrically conductive contact with a positive electrode current collector;
    a negative electrode comprising a negative electrode active material in electrically conductive contact with a negative electrode current collector and a negative electrode tab including a first attachment end and a second attachment end;
    an electrically insulative and ion conductive medium in ionically conductive contact with the positive electrode and the negative electrode, wherein the ionically conductive medium comprises an ion conductive layer and an electrolyte; and
    an outer case containing the positive electrode, negative electrode and electrically insulative and ion conductive medium, wherein the outer case comprises a scored area connected to a cooling plate,
    wherein the first attachment end of the negative electrode tab is connected to the negative electrode current collector and the second attachment end of the negative electrode tab is connected to an internal bottom of the outer case in an area within the scored area, and
    wherein an electrically insulative tape is adhered on both sides of an exposed portion of the negative electrode tab except at an attached portion of the second attachment end where the attached portion is connected to the internal bottom of the outer case.

2. The electrochemical cell of claim 1, wherein the connection to the cooling plate is by an electrically insulating adhesive.

3. The electrochemical cell of claim 2, wherein an area on the bottom side that is outside of the scored area is not adhered to the cooling plate with the electrically insulating adhesive.

4. The electrochemical cell of claim 2, wherein an electrically insulating layer is positioned between the adhesive and the cooling plate.

5. The electrochemical cell of claim 1, wherein the scored area is a circular shape, and wherein the scored area is at least partially adhered to the cooling plate with an electrically insulating adhesive.

6. The electrochemical cell of claim 1, wherein each of the scored area and a non-scored area that is outside of the scored area on the bottom side are at least partially adhered to the cooling plate.

7. The electrochemical cell of claim 5, wherein an area on the bottom side that is outside of the scored area is not adhered to the cooling plate with the electrically insulating adhesive.

8. The electrochemical cell of claim 2, wherein the electrically insulating adhesive has a lap shear strength of about 1,500 psi to about 4,500 psi and a tensile strength of about 1,000 to about 3,500 psi.

9. The electrochemical cell of claim 1, wherein when a physical force is applied to the electrochemical cell, the scored area breaks from an area outside of the scored area on the electrochemical cell to form an opening between the scored area and the area outside of the scored area on the electrochemical cell.

10. An energy storage device, comprising:
    at least one electrochemical cell, comprising:
    a positive electrode comprising a positive electrode active material in electrically conductive contact with a positive electrode current collector;
    a negative electrode comprising a negative electrode active material in electrically conductive contact with a negative electrode current collector and a negative electrode tab including a first attachment end and a second attachment end;
    an electrically insulative and ion conductive medium in ionically conductive contact with the positive electrode and the negative electrode, wherein the ionically conductive medium comprises an ion conductive layer and an electrolyte; and
    an outer case containing the positive electrode, negative electrode and electrically insulative and ion conductive medium,
    wherein the outer case comprises a scored area rigidly connected to a cooling plate, and
    wherein the first attachment end of the negative electrode tab is connected to the negative electrode current collector and the second attachment end of the negative electrode tab is connected to an internal bottom of the outer case within the scored area.

11. The energy storage device of claim 10, wherein the negative electrode tab is welded to the internal bottom of the outer case.

12. The energy storage device of claim 11, wherein the negative electrode tab is at least partially adhered to the internal bottom of the outer case using an electrically insulative adhesive.

13. The energy storage device of claim 11, further comprising an electrically insulative tape that is adhered on one or both sides of the negative electrode tab except at a welded area on the negative electrode tab where it is welded to the internal bottom of the outer case.

14. The energy storage device of claim 10, wherein when a physical force is applied to the at least one electrochemical cell, the scored area breaks from an area outside of the scored area to form an opening between the scored area and the area outside of the scored area on the electrochemical cell.

15. The energy storage device of claim 11, wherein an area of the negative electrode tab that is not in contact with the electrically insulative tape is only adjacent to a portion of the area inside the scored area.

16. The energy storage device of claim 10, further comprising an electrically insulative coating that is adhered on at least a portion of an internal surface of the outer case, wherein the electrically insulative coating is between an exposed portion of the negative electrode tab and the internal surface of the outer case.

17. An energy storage device, comprising:
    at least one electrochemical cell, comprising:
    a positive electrode comprising a positive electrode active material in electrically conductive contact with a positive electrode current collector;

a negative electrode comprising a negative electrode active material in electrically conductive contact with a negative electrode current collector;

an electrically insulative and ion conductive medium in ionically conductive contact with the positive electrode and the negative electrode, wherein the ionically conductive medium comprises an ion conductive layer and an electrolyte;

an outer case containing the positive electrode, negative electrode and electrically insulative and ion conductive medium, wherein the outer case is adhered to a cooling plate, and a negative electrode tab including a first attachment end and a second attachment end, wherein the first attachment end of the negative electrode tab is connected to the negative electrode current collector and the second attachment end of the negative electrode tab is connected to an internal bottom of the outer case in a same area where the outer case is adhered to the cooling plate.

18. The energy storage device of claim 17, wherein the outer case is adhered using an electrically insulating liquid adhesive.

19. The energy storage device of claim 18, further comprising an electrically insulating coating layer between the electrically insulating liquid adhesive and the cooling plate, wherein the electrically insulating coating layer decreases an electrical conductivity between the electrically insulating liquid adhesive and the cooling plate.

20. The energy storage device of claim 17, further comprising:

an electrically insulating coating adhered to an exposed portion of the negative electrode tab except at an attached portion of the second attachment end where the attached portion is connected to the internal bottom of the outer case.

* * * * *